United States Patent
Grasset et al.

(10) Patent No.: US 12,504,973 B2
(45) Date of Patent: Dec. 23, 2025

(54) TECHNIQUE FOR HANDLING DATA ELEMENTS STORED IN AN ARRAY STORAGE

(71) Applicant: Arm Limited, Cambridge (GB)

(72) Inventors: Arnaud Philippe Claude Grasset, Biot (FR); Jelena Milanovic, Biot (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/855,222

(22) PCT Filed: Mar. 13, 2023

(86) PCT No.: PCT/GB2023/050584
§ 371 (c)(1),
(2) Date: Oct. 8, 2024

(87) PCT Pub. No.: WO2023/199014
PCT Pub. Date: Oct. 19, 2023

(65) Prior Publication Data
US 2025/0173148 A1    May 29, 2025

(30) Foreign Application Priority Data
Apr. 13, 2022 (GB) ..................... 2205491

(51) Int. Cl.
*G06F 9/30* (2018.01)
(52) U.S. Cl.
CPC ...... *G06F 9/30032* (2013.01); *G06F 9/30036* (2013.01); *G06F 9/30038* (2023.08); *G06F 9/30196* (2013.01)
(58) Field of Classification Search
CPC ............. G06F 9/30032; G06F 9/30036; G06F 9/30038
See application file for complete search history.

(56) References Cited

U.S. PATENT DOCUMENTS

| | | | |
|---|---|---|---|
| 3,544,965 A | 12/1970 | Packard | |
| 2013/0024669 A1* | 1/2013 | Gonion | G06F 8/4441 712/222 |

(Continued)

FOREIGN PATENT DOCUMENTS

| | | |
|---|---|---|
| EP | 3629154 A2 | 4/2020 |
| EP | 3929736 A1 | 12/2021 |
| WO | 2005013084 A2 | 2/2005 |

OTHER PUBLICATIONS

Combined Search and Examination Report for GB2205491.0, dated Dec. 2, 2022.

(Continued)

*Primary Examiner* — William B Partridge
(74) *Attorney, Agent, or Firm* — NIXON & VANDERHYE P.C.

(57) ABSTRACT

An apparatus is provided comprising processing circuitry to perform operations, instruction decoder circuitry to decode instructions to control the processing circuitry to perform the operations specified by the instructions, and array storage comprising storage elements to store data elements. The array storage is arranged to store at least one two dimensional array of data elements accessible to the processing circuitry when performing the operations, each two dimensional array of data elements comprising a plurality of vectors of data elements, where each vector is one dimensional. The instruction decoder circuitry is arranged, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage (Continued)

elements of the array storage that were used to store the data elements of the one or more identified vectors.

15 Claims, 18 Drawing Sheets

(56) References Cited

U.S. PATENT DOCUMENTS

2015/0154023 A1\* 6/2015 Macy, Jr. ............ G06F 9/30098
  712/208
2021/0042261 A1 2/2021 Milanovic et al.

OTHER PUBLICATIONS

Robert Bedichek, "Some Efficient Architecture Simulation Techniques," Department of Computer Science, FR-35 University of Washington, Seattle, Washington 98195.

\* cited by examiner

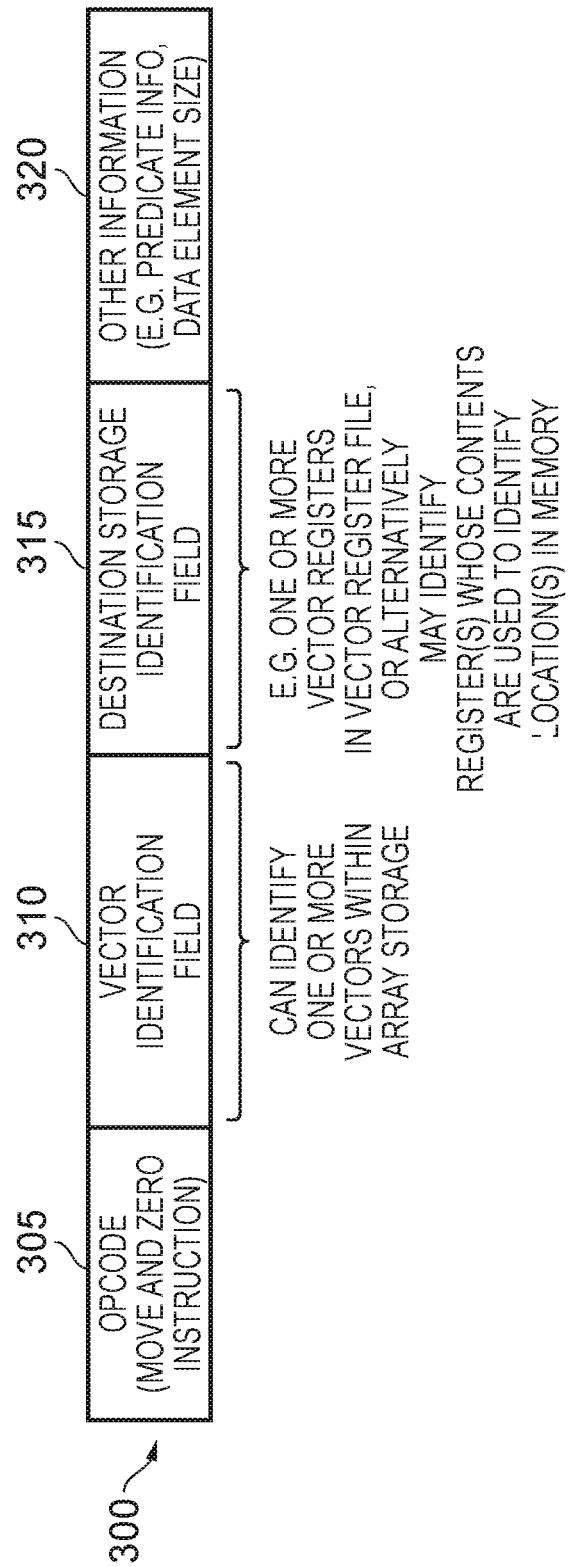
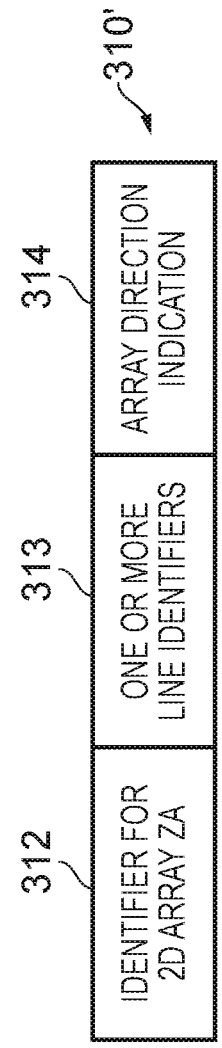
FIG. 5A
FIG. 5B

EXAMPLE INSTRUCTION SEQUENCE OPERATING ON ARRAY STORAGE

1) DATA PROCESSING INSTRUCTION 1 (ACCUMULATES INTO 2D ARRAY)
2) DATA PROCESSING INSTRUCTION 2 (ACCUMULATES INTO 2D ARRAY)
3) DATA PROCESSING INSTRUCTION 3 (ACCUMULATES INTO 2D ARRAY)
4) MOVE AND ZERO INSTRUCTION (VERTICAL VECTOR 1, VECTOR REGISTER $Z_i$)
   - VERTICAL VECTOR 1 HOLDS FINAL ACCUMULATE RESULTS AND
       EXECUTION OF MOVE AND ZERO INSTRUCTION MOVES
         THOSE FINAL ACCUMULATE RESULTS TO $Z_i$ AND
           CLEARS STORAGE ELEMENTS FOR VERTICAL VECTOR 1
5) DATA PROCESSING INSTRUCTION 4 (ACCUMULATES INTO 2D ARRAY-
                      CAN RE-USE VERTICAL COLUMN 1)
6) MOVE AND ZERO INSTRUCTION (VERTICAL VECTOR 2, VECTOR REGISTER $Z_{i+x}$)
   - VERTICAL VECTOR 2 HOLDS FINAL ACCUMULATE RESULTS AND
       EXECUTION OF MOVE AND ZERO INSTRUCTION MOVES
         THOSE FINAL ACCUMULATE RESULTS TO $Z_{i+x}$ AND
           CLEARS STORAGE ELEMENTS FOR VERTICAL VECTOR 2
7) DATA PROCESSING INSTRUCTION 5 (ACCUMULATES INTO 2D ARRAY
                      - CAN RE-USE VERTICAL COLUMN 2)

FIG. 7

ALTERNATIVE EXAMPLE INSTRUCTION SEQUENCE OPERATING ON ARRAY STORAGE

ASSUMES ZAR 2, ZAR 3 AND ZAR 4 INITIALISED TO ZERO
1) DATA PROCESSING INSTRUCTION (ACCUMULATES INTO ZAR 2, ZAR 3 AND ZAR 4)
2) DATA PROCESSING INSTRUCTION (ACCUMULATES INTO ZAR 2, ZAR 3 AND ZAR 4)
3) MOVE AND ZERO INSTRUCTION (ZAR 2, ZAR 3, ZAR 4 TO $Z_i, Z_{i+1}, Z_{i+2}$)
   - MOVES ALL ACCUMULATE RESULTS OUT TO
       VECTOR REGISTERS IN VECTOR REGISTER FILE
       AND CLEARS ZAR 2, ZAR 3 & ZAR 4)
4) DATA PROCESSING INSTRUCTION (ACCUMULATES INTO ZAR 2, ZAR 3 AND ZAR 4)
       EXECUTION CAUSES EFFECTIVITY A NON-ACCUMULATING
       VARIANT OF THE DEFINED OPERATION TO BE PERFORMED,
       WITH RESULTS PRODUCED AND STORED IN EACH OF
       ZAR 2, ZAR 3 AND ZAR 4)

5) DATA PROCESSING INSTRUCTION (ACCUMULATES INTO ZAR 2, ZAR 3 AND ZAR 4)

FIG. 10

TECHNIQUE FOR HANDLING DATA ELEMENTS STORED IN AN ARRAY STORAGE

BACKGROUND

The present technique relates to the field of data processing, and more particularly to the handling of data elements stored in an array storage.

Some modern data processing systems can provide an array storage for storing one or more two-dimensional arrays of data elements that can be accessed by processing circuitry of the data processing system when performing data processing operations. This can provide an efficient mechanism for performing a number of different types of operations, for example operations that include an accumulate function, where the accumulate outputs can be maintained within the two-dimensional array of data elements.

However, to make best use of the efficiency gains that may be realised from the use of such an array storage, it would be beneficial to provide an efficient mechanism for transferring data elements out of the array storage in a manner that freed up the resources of the array storage for use in connection with subsequent operations.

SUMMARY

In one example arrangement, there is provided an apparatus comprising: processing circuitry to perform operations; instruction decoder circuitry to decode instructions to control the processing circuitry to perform the operations specified by the instructions; and array storage comprising storage elements to store data elements, the array storage being arranged to store at least one two dimensional array of data elements accessible to the processing circuitry when performing the operations, each two dimensional array of data elements comprising a plurality of vectors of data elements, where each vector is one dimensional; wherein the instruction decoder circuitry is arranged, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage elements of the array storage that were used to store the data elements of the one or more identified vectors.

In a further example arrangement, there is provided a method of handling data elements within an array storage of an apparatus, comprising: employing processing circuitry to perform operations; employing instruction decoder circuitry to decode instructions to control the processing circuitry to perform the operations specified by the instructions; providing, within the array storage, storage elements to store data elements, the array storage being arranged to store at least one two dimensional array of data elements accessible to the processing circuitry when performing the operations, each two dimensional array of data elements comprising a plurality of vectors of data elements, where each vector is one dimensional; and employing the instruction decoder circuitry, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage elements of the array storage that were used to store the data elements of the one or more identified vectors.

In a still further example arrangement there is provided a computer program for controlling a host data processing apparatus to provide an instruction execution environment, comprising: processing program logic to perform operations; instruction decode program logic to decode instructions to control the processing program logic to perform the operations specified by the instructions; and array storage emulating program logic to emulate an array storage comprising storage elements to store data elements, the array storage being arranged to store at least one two dimensional array of data elements accessible to the processing program logic when performing the operations, each two dimensional array of data elements comprising a plurality of vectors of data elements, where each vector is one dimensional; wherein the instruction decode program logic is arranged, in response to a move and zero instruction that identifies one or more vectors of data elements of a given two dimensional array of data elements within the array storage, to control the processing program logic to move the data elements of the one or more identified vectors from the array storage to a destination storage and to set to a logic zero value the storage elements of the array storage that were used to store the data elements of the one or more identified vectors.

BRIEF DESCRIPTION OF THE DRAWINGS

The present technique will be described further, by way of illustration only, with reference to examples thereof as illustrated in the accompanying drawings, in which:

FIG. 5A schematically illustrates fields that may be provided within a move and zero instruction in accordance with one example implementation, and FIG. 5B schematically illustrates subfields that may be used in one particular example implementation to implement the vector identification field of the move and zero instruction;

FIG. 7 illustrates one example instruction sequence that may operate on data elements provided within the array storage, where the instruction sequence includes a number of instances of the move and zero instruction described herein;

FIG. 10 illustrates an alternative example instruction sequence that may operate on data elements provided within the array storage, where the instruction sequence includes a number of instances of the move and zero instruction described herein;

DESCRIPTION OF EXAMPLES

Figure 1:
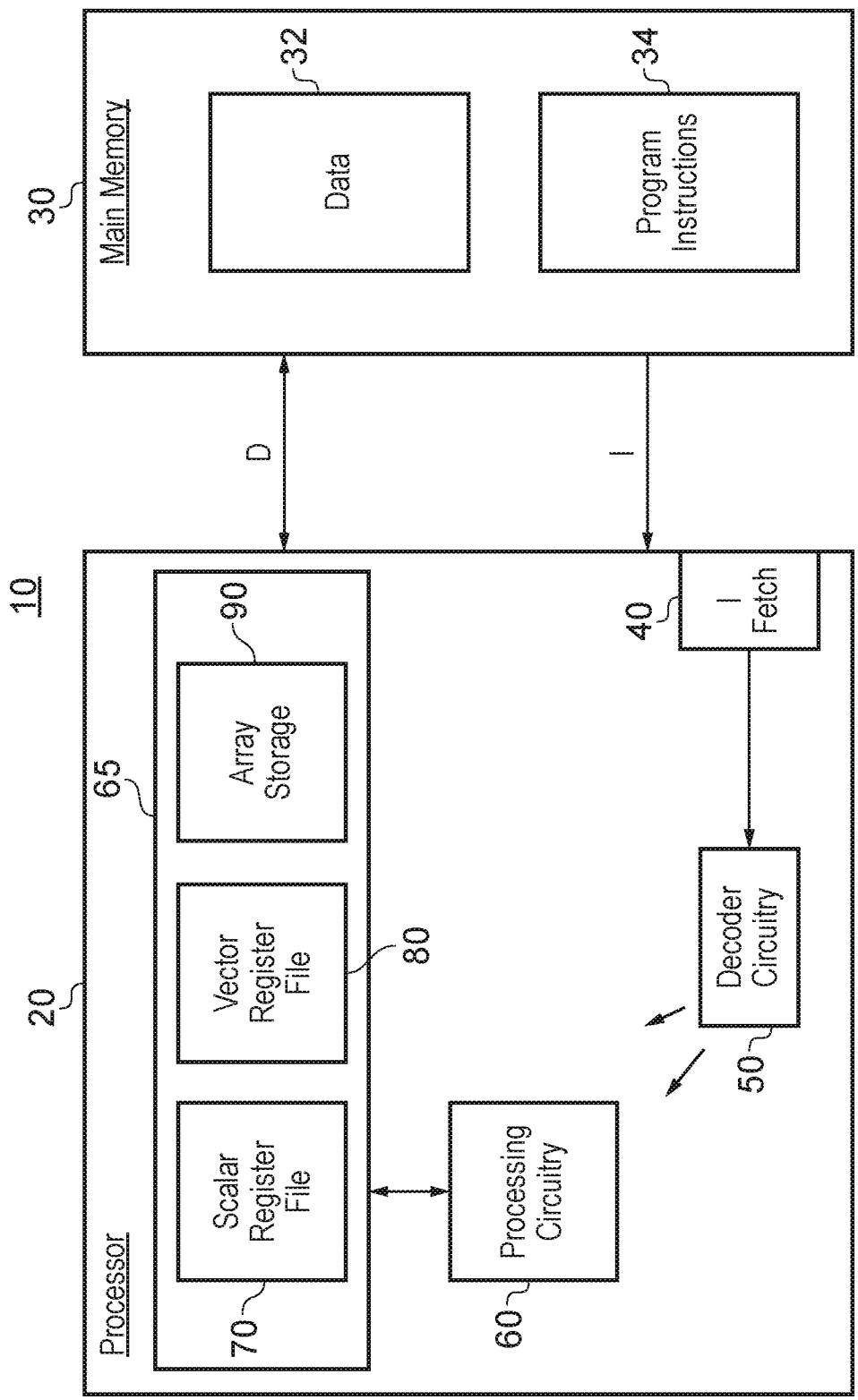
FIG. 1 is a block diagram of an apparatus in accordance with one example implementation.

In one example arrangement, an apparatus is provided that has processing circuitry for performing operations, and instruction decoder circuitry for decoding instructions to control the processing circuitry to perform the operations specified by the instructions. An array storage is also provided that comprises storage elements to store data elements. The array storage is arranged to store at least one two dimensional array of data elements accessible to the processing circuitry when performing the operations, each two dimensional array of data elements comprising a plurality of vectors of data elements, where each vector is one dimensional.

As mentioned earlier, the use of an array storage can provide a very efficient mechanism for performing certain types of operations, for example accumulate operations. The accumulate operations may solely perform an accumulate function, but alternatively may incorporate additional processing in addition to the accumulate function (purely by way of example the accumulate operation may perform a multiply accumulate function of the form A=A+B*C). To make the most of the potential efficiency benefits that can be realised, it may be necessary to have an efficient mechanism for moving the data elements out of the array storage when they are no longer being subjected to computations performed using the array storage, and also an efficient mechanism for freeing up the associated storage elements of the array storage so that they are available for use in association with subsequent computations.

In accordance with one example implementation, a move and zero instruction is provided that can enable a significant improvement in the efficiency of such a process. In particular, in one example implementation, the instruction decoder circuitry may be arranged, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage elements of the array storage that were used to store the data elements of the one or more identified vectors.

Hence, in accordance with the above technique, a single instruction can be specified that, when executed, causes both the data elements in one or more identified vectors of data elements within a given two-dimensional array to be moved out of the array storage, and in addition causes the associated storage elements of the array storage that were storing those data elements to be cleared to a logic zero value, hence preparing them for use in a subsequent computation.

This can significantly improve performance. In particular, the act of moving the data elements out of the array storage, and the act of preparing the associated storage elements for reuse, do not in themselves perform useful computation, and hence can be viewed as an overhead associated with the use of the array storage. By allowing a single instruction to cause both the data elements to be moved, and the associated storage elements to be cleared to a logic zero value, this can significantly reduce that overhead.

In particular, prior known techniques would have required at least one move instruction to be executed to move the required data elements out of the array storage to a specified destination storage, and thereafter one or more additional move instructions would be required to move one or more vectors of logic zero values from one or more source vector registers into the relevant storage elements of the array storage. This hence creates a sequence of dependent instructions that have to be performed one after the other. For example, considering merely the simple case where a first move instruction is used to move one vector of data elements out of the array storage, and then a second move instruction is used to move a vector of logic zero values from a specified source vector register into the relevant storage elements of the array storage, there are clearly two dependent move instructions that need to be performed one after the other, and this instruction dependency is removed through use of the new move and zero instruction.

Further, it has been found that the hardware cost associated with performing the combined move and zeroing operation can in some implementations be the same as the hardware cost associated with doing just a standard move operation to move the vector of data elements out of the array storage, and hence the zeroing of the relevant storage elements can be effectively obtained for no additional hardware overhead. Further the performance (execution speed) of the combined move and zeroing operation has been found in one example implementation to be the same as merely performing a single move operation.

Furthermore, the use of the present technique avoids the need to store logic zero values within vector registers that would otherwise be required to be used as source operands for move instructions used to move those logic zero values into the array storage, hence freeing up one or more vector registers within the vector register file.

In addition, it can be seen that performance is improved, since there is no need for separate move instructions to perform the zeroing functionality.

It has been found that such an approach is highly beneficial in many example use cases of the array storage. For example, the array storage is often used to accumulate results produced when performing a number of iterations of accumulate operations, and when the final accumulate results are produced they are typically moved out of the array storage, for example by being moved to one or more vector registers provided within the apparatus. When the array storage is being used in the performance of accumulate operations, it is only possible to reuse the storage elements that were storing those final accumulate results for a new series of accumulate operations if those storage elements are first set to a logic zero value, and the use of the move and zero instruction as described herein can enable this to be efficiently achieved.

Hence, in one example implementation, the processing circuitry may be arranged to perform a plurality of iterations of accumulate operations and to use the given two dimensional array of data elements to maintain accumulate results produced when performing the accumulate operations, wherein after a given iteration of the accumulate operations at least one given vector of data elements in the given two dimensional array of data elements is arranged to store final accumulate results whilst the remaining vectors of data elements in the given two dimensional array of data elements are arranged to store intermediate accumulate results. In such an implementation, the move and zero instruction may be arranged to identify the at least one given vector of data elements and may be executed after the given iteration of the accumulate operations to cause the processing circuitry to move the final accumulate results of the at least one given vector from the array storage to the destination storage and to clear the storage elements of the array storage that were used to store the final accumulate results of the at least one given vector in order to free those storage elements for use in subsequent accumulate operations.

It should be noted that the accumulate operations referred to above could merely perform accumulate functions (for example of the form A=A+B), but more typically may also involve some additional processing operation in addition to the accumulate function. Hence, the accumulate operation may include a processing operation that is performed to generate a processing operation result value that is then accumulated with an existing data element value in an associated storage element of the array storage to create a new data element value to be stored within that associated storage element of the array storage. Purely by way of example, the accumulate operation referred to above may be a multiply accumulate operation (for example of the form A=A+B*C).

There are various types of data processing operations that may make use of the above-mentioned accumulate functionality, and for which the use of the array storage may provide an efficient implementation technique. In one particular example use case, the plurality of iterations of accumulate operations are processing and accumulate operations used to implement a finite impulse response (FIR) filtering operation on an array of input data elements, and the given two dimensional array of data elements within the array storage may be used to maintain an array of output data elements generated during performance of the FIR filtering operation. The processing circuitry may be arranged during each iteration of the accumulate operations to process a single vector of input data elements and to produce output data elements for accumulating within multiple vectors of the array of output data elements.

The correspondence between the input data elements and the output data elements may vary dependent on implementation. For example, one vector of input data elements may be associated with multiple vectors of output data elements. In addition, those multiple vectors of output data elements may be arranged in either or both of the horizontal and vertical directions within the array storage (in order to support implementations where the vectors can be accessed in both horizontal and vertical directions the two dimensional array of data elements will typically be a two dimensional square array of data elements). Further, the size of the input data elements and the output data elements may be different.

Such a technique as described above can take advantage of an outer product approach to compute FIR filtering implemented by a sliding window technique, using a square array of data elements. Such a technique typically results in some of the vectors of the square array of output data elements being finalised before other vectors of output data elements, and hence the use of the above described move and zero instruction can enable those finalised vectors of output data elements to be moved out of the array storage, with the associated storage elements being freed up for use in association with other vectors of output data elements.

The array of input data elements can take a variety of forms, but in one example implementation could represent an array of pixel values. However, the techniques described herein are equally applicable to other arrays of data elements that may for example not represent image data.

In some example implementations the multiple vectors of output data elements produced by processing a row of input data elements may be referred to as being multiple "rows" of output data elements. However, as mentioned earlier, it should be noted that the rows of output data elements accumulated within a given square 2D array of data elements (such a square 2D array may also be referred to as a square sub-array herein) of output data elements can be stored in any desired orientation within the array storage. For example, a row may be stored as a horizontal vector within the square sub-array or as a vertical vector within the square sub-array, and hence the term "row" should not be taken herein as implying any particular orientation of data elements within the array storage.

In one example arrangement, the given two dimensional array of data elements is a square two dimensional array of data elements, the plurality of vectors forming the square two dimensional array of data elements comprise a first plurality of vectors arranged in a first array direction and a second plurality of vectors arranged in a second array direction orthogonal to the first array direction, and each instance of the move and zero instruction is arranged to identify one or more vectors of data elements that either all extend in the first array direction or all extend in the second array direction. Hence, this provides a great degree of flexibility in how the various vectors of data elements to be moved out of the array storage are identified.

The one or more two-dimensional arrays of data elements stored within the array storage can take a variety of forms, depending on implementation. In one particular example implementation, the processing circuitry is arranged to perform processing operations on the square two dimensional array of data elements during which the processing circuitry is enabled to access vectors of data elements in both the first array direction and the second array direction.

In one example implementation, the array storage can be configured to comprise a plurality of array vector registers extending in a first array direction. The processing circuitry may be arranged to perform one or more accumulation operations, where each accumulation operation is arranged to produce output data for accumulating within a group of multiple array vector registers of the array storage. Hence, in such an implementation, the array storage is viewed as comprising multiple separately addressable array vector registers extending within a single direction, and the earlier-mentioned given two dimensional array of data elements may be considered to comprise the data elements stored within the group of multiple array vector registers referred to above.

In such an example implementation, the move and zero instruction may be executed, once performance of the one or more accumulation operations has resulted in final result data being present in the one or more identified vectors identified by the move and zero instruction, to cause the processing circuitry to move the data elements of the one or more identified vectors from the array storage to the destination storage and to set to a logic zero value each array vector register within the group of multiple array vector registers that was used to store the data elements of the one or more identified vectors.

In one particular example implementation, when the processing circuitry has completed performance of the one or more accumulation operations, final result data is present in each array vector register in the group of multiple array vector registers. Execution of the move and zero instruction can then cause the final result data to be moved from the group of multiple array vector registers to the destination storage, and for each array vector register in the group of multiple array vector registers to be cleared to zero. This then enables the processing circuitry to re-use one or more array vector registers from the group of array vector registers for any desired subsequent processing operation (thus for example execution of a subsequent accumulate instruction using any or all of those array vector registers will cause a non-accumulating variant to be performed due to the contents of the array vector registers being cleared to zero).

The destination storage specified for the move and zero instruction can take a variety of forms. In one example implementation, the apparatus may further provide a vector register file comprising a plurality of vector registers, and the move and zero instruction may be arranged to indicate, as the destination storage, one or more vector registers within the vector register file. There are various ways in which the move and zero instruction may be arranged to identify the one or more vector registers. For example, in a single vector register case where a single vector of data elements is to be moved out of the array storage, the move and zero instruction may provide an identifier used to determine that single vector register. For a multiple vector register case where multiple vectors of data elements are to be moved out of the array storage, those multiple vector registers could be identified explicitly using separate identifier information for each of the vector registers, or alternatively one vector register may be identified by the instruction, with the other vector registers in the multiple vector registers being implicit. For example, the multiple vector registers may be a sequence of adjacent vector registers starting with the vector register that has been explicitly identified, or the multiple vector registers may each be separated by a constant stride value.

However, in an alternative implementation, if desired, the move and zero instruction may be arranged to indicate, as the destination storage, one or more locations in memory to which the data elements of the one or more identified vectors are to be stored. In such a case, the move and zero instruction may instead be referred to as a store and zero instruction.

There are various ways in which the move and zero instruction may be arranged to identify the memory locations to which the one or more vectors of data elements are to be moved. For example, considering the single vector case where only a single vector of data elements is to be moved to memory, the move and zero instruction may be arranged to identify a location in memory, with the vector of data elements then being written to a contiguous memory addresses identified by that location (in this case the location may for example be the memory address of the first data element). If multiple vectors are to be moved, then multiple discrete locations in memory may be identified by the instruction, with each of the vectors of data elements being moved to a sequence of memory addresses identified by one of the specified locations. Alternatively, one location could be specified by the instruction, and the other locations may be implicit (for example those locations identifying memory addresses at a fixed stride/offset from the identified location).

It is also possible that the individual elements of a single vector may need to be stored to discrete memory locations depending on the array direction accessed and the nature of the data elements held in that accessed vector within the array. However, in situations where individual data elements within a single vector need to be stored to discrete memory locations, it will typically be the case that the vector of data elements is first moved to a vector register before in due course being transferred to memory.

There are a number of ways in which the one or more vectors of data elements to be moved may be identified by the move and zero instruction. In one example implementation, the move and zero instruction may comprise a vector identification field used to identify the one or more vectors of data elements of the given two dimensional array of data elements within the array storage. For instance, when a single vector of data elements is to be moved, an identifier sufficient to identify that single vector may be provided. When multiple vectors of data elements are to be moved, then the vector identification field may be used to provide sufficient information to explicitly identify each of those multiple vectors, or alternatively one vector of data elements may be explicitly identified, with the other vectors then being implicit, for example adjacent vectors, or regularly spaced vectors (often referred to as a stride access). In this latter case a number may be provided by the vector identification field to identify the number of vectors to be moved.

In the earlier-mentioned approach where accesses can be in either array direction, then the vector identification field can also be used to provide sufficient information to identify the array direction being accessed. For example, in one implementation, the vector identification field may comprise a first sub-field to identify the square two dimensional array, and a second subfield providing one or more line identifiers and an array direction indication used to identify the one or more vectors.

In one example implementation, the move and zero instruction may comprise a predicate field to identify predicate information used to identify which data elements of the one or more identified vectors are to be moved from the array storage to the destination storage and have their associated storage elements set to the logic zero value. This can provide additional flexibility, by enabling the functionality to be limited to particular data elements within particular vectors.

In some implementations where predication is used, the data element size may be able to be varied, and in such cases the move and zero instruction may comprise a size field to identify a size of each data element within the one or more identified vectors. By enabling the instruction to provide this additional information, it is possible to allow the instruction to be used for a variety of different data element sizes being processed within the system whilst enabling the move and zero operation to be performed in respect of a subset of the total data elements within the one or more identified vectors.

In accordance with another technique described herein, an additional new form of instruction is provided that can also be used to zero vectors of data elements within the array storage, and to provide for an improvement in performance when performing accumulate operations using such an array storage. In accordance with this technique, an apparatus is provided that has processing circuitry for performing operations, instruction decoder circuitry for decoding instructions to control the processing circuitry to perform the operations specified by the instructions, and an array storage comprising storage elements to store data elements. As with the earlier described technique, the array storage is arranged to store at least one two dimensional array of data elements accessible to the processing circuitry when performing the operations, each two dimensional array of data elements comprising a plurality of vectors of data elements, where each vector is one dimensional. In accordance with this additional technique, the instruction decoder circuitry is arranged, in response to decoding a zero vectors instruction that identifies multiple vectors of data elements of a given two dimensional array of data elements within the array storage, to also decode a subsequent accumulate instruction arranged to operate on the identified multiple vectors of data elements, and to control the processing circuitry to perform a non-accumulating variant of an accumulate operation specified by the accumulate instruction to produce result data elements for storing in the identified multiple vectors within the array storage.

By use of the above approach, the zero vectors instruction can be fused/merged, at the time of decoding by the instruction decoder circuitry, with a subsequent accumulate instruction that specifies the same multiple vectors of data elements as specified by the zero vectors instruction, to in effect create a non-accumulating variant of that accumulate instruction. It has been found that such an approach can be highly beneficial, as instruction encoding space is typically quite constrained, and whilst it may be desirable to provide a number of different accumulate instructions for performing accumulate operations in respect of multiple vectors within the array storage, it may be highly undesirable to seek to also provide non-accumulating variants of those instructions due to the amount of instruction encoding space that would be consumed by providing those non-accumulating variants. By using the present technique, there is no need to provide the non-accumulating variants of the instructions, and instead they can be simulated by combining the zero vectors instruction with a subsequent accumulate instruction in order to cause the processing circuitry to perform the non-accumulating variants.

In one example implementation, the array storage may comprise a plurality of array vector registers extending in a first array direction, and the identified multiple vectors within the array storage are provided by a group of multiple array vector registers of the array storage. In such a configuration, the given two dimensional array of data elements may comprise the data elements stored within the group of multiple array vector registers. Further, the subsequent accumulate instruction may specify a processing operation that includes an accumulate operation to be performed on the identified multiple vectors of data elements (i.e. on the same group of multiple array vectors as specified by the zero vectors instruction), and the zero vectors instruction may be used in combination with the subsequent accumulate instruction to enable performance by the processing circuitry of a non-accumulating variant of the processing operation.

In one example implementation, the zero vectors instruction may comprise a vector identification field used to identify the multiple vectors of data elements of the given two dimensional array of data elements within the array storage.

As with the earlier discussed move and zero instruction, the zero vectors instruction may if desired comprise a predicate field to identify predicate information used to identify which storage elements within the multiple identified vectors are to be set to the logic zero value. Such an approach could in effect allow some data elements to be subjected to a non-accumulating variant of a subsequent accumulate instruction whilst other data elements are subjected to the true accumulating variant. Also, if desired the zero vectors instruction may comprise a size field to identify a size of each data element within the multiple identified vectors.

Particular example implementations will now be discussed with reference to the figures.

FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetched program instructions to instruction decoder circuitry 50. The decoder circuitry 50 decodes the fetched program instructions and generates control signals to control processing circuity 60 to perform processing operations upon data values held within storage elements of register storage 65 as specified by the decoded vector instructions. As shown in FIG. 1, the register storage 65 may be formed of multiple different blocks. For example, a scalar register file 70 may be provided that comprises a plurality of scalar registers that can be specified by instructions, and similarly a vector register file 80 may be provided that comprises a plurality of vector registers that can be specified by instructions.

As also shown in FIG. 1, the processor 20 can access an array storage 90. In the example shown in FIG. 1, the array storage 90 is provided as part of the processor 20, but this is not a requirement. In various examples, the array storage can be implemented as any one or more of the following: architecturally-addressable registers; non-architecturally-addressable registers; a scratchpad memory; and a cache.

The processing circuitry 60 may in one example implementation comprise both vector processing circuitry and scalar processing circuitry. A general distinction between scalar processing and vector processing is as follows. Vector processing may involve applying a single vector processing instruction to data elements of a data vector having a plurality of data elements at respective positions in the data vector. In accordance with the present technique the processing circuitry may also perform vector processing to perform operations on a plurality of vectors within a two dimensional array of data elements (which may also be referred to as a sub-array) stored within the array storage 90. Scalar processing operates on, effectively, single data elements rather than on data vectors. Vector processing can be useful in instances where processing operations are carried out on many different instances of the data to be processed. In a vector processing arrangement, a single instruction can be applied to multiple data elements (of a data vector) at the same time. This can improve the efficiency and throughput of data processing compared to scalar processing.

The processor 20 may be arranged to process two dimensional arrays of data elements stored in the array storage 90. The two-dimensional arrays may, in at least some examples, be accessed as one-dimensional vectors of data elements in multiple directions. In one example implementation, the array storage 90 may be arranged to store one or more two dimensional arrays of data elements, and each two dimensional array of data elements may form a square array portion of a larger or even higher-dimensioned array of data elements in memory.

Figure 2:
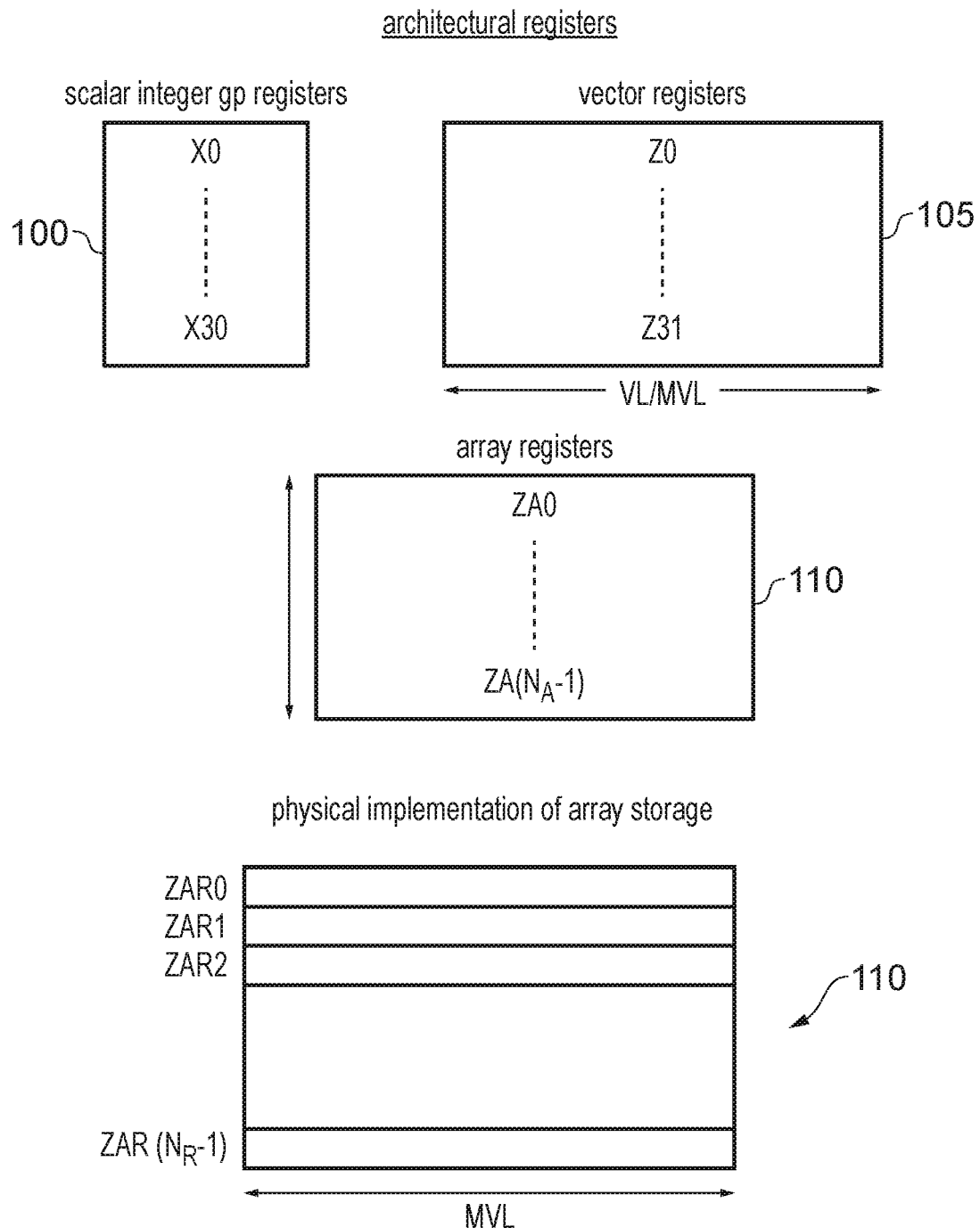
FIG. 2 shows an example of architectural registers that may be provided within the apparatus, including vector registers for storing vector operands and array registers for storing 2D arrays of data elements, including an example of a physical implementation of the array registers.

FIG. 2 shows an example of the architectural registers 65 of the processor 20 that may be provided in one example implementation. The architectural registers (as defined in the instruction set architecture (ISA)) may include a set of scalar integer registers 100 which act as general purpose registers for processing operations performed by scalar processing circuitry within the processing circuitry 60. For example there may be a certain number of general purpose registers 100 provided, for example 31 registers X0-X30 in this example (the $32^{nd}$ encoding of a scalar register field may not correspond to a register provided in hardware, as it may be considered by default to indicate a value of zero, for example, or could be used to indicate a dedicated type of register which is not a general purpose register). It may be possible to access scalar registers of different sizes mapped to the same physical storage. For example, the register labels X0-X30 may refer to 64-bit registers, but the same registers could also be accessed as 32-bit registers (e.g. accessed using the lower 32 bits of each 64-bit register provided in hardware), in which case register labels W0-W30 may be used in assembler code to reference the same registers.

Also, the architectural registers available for selection by program instructions in the ISA supported by the decoder 50 may include a certain number of vector registers 105 (labelled Z0-Z31 in this example). Of course, it is not essential to provide the number of scalar/vector registers shown in FIG. 2, and other examples may provide a different number of registers specifiable by program instructions. Each vector register may store a vector operand comprising a variable number of data elements, where each data element may represent an independent data value. In response to vector processing (SIMD) instructions, the processing circuitry may perform vector processing on vector operands stored in the registers to generate results. For example the vector processing may include lane-by-lane operations where a corresponding operation is performed on each lane of elements in one or more operand vectors to generate corresponding results for elements of a result vector. When performing vector or SIMD processing, each vector register may have a certain vector length VL where the vector length refers to the number of bits in a given vector register. The vector length VL used in vector processing mode may be fixed for a given hardware implementation or could be variable. The ISA supported by the processor 20 may support variable vector lengths so that different processor implementations may choose to implement different sized vector registers but the ISA may be vector length agnostic so that the instructions are designed so that code can function correctly regardless of the particular vector length implemented on a given CPU executing that program.

The vector registers Z0-Z31 may also serve as operand registers for storing the vector operands which provide the inputs to processing and accumulate operations performed by the processing circuitry 60 on two dimensional arrays of data elements stored within the array storage 90. When the vector registers are used to provide inputs to such an operation, then the vector registers have a vector length MVL, which may be the same as the vector length VL used for vector operations, or could be a different vector length.

As shown in FIG. 2, the architectural registers also include a certain number $N_A$ of array registers 110 forming the earlier-mentioned array storage 90, ZA0-ZA ($N_A$-1). Each array register can be seen as a set of register storage for storing a single 2D array of data elements, e.g. the result of a processing and accumulate operation. However, processing and accumulate operations may not be the only operations which can use the array registers. The array registers could also be used to store square arrays while performing transposition of the row/column direction of an array structure in memory. When a program instruction references one of the array registers 110, it is referenced as a single entity using an array identifier ZAi, but some types of instructions (e.g. data transfer instructions) may also select a sub-portion of the array by defining an index value which selects a part of the array (e.g. one horizontal/vertical group of elements).

In practice the physical implementation of the register storage corresponding to the array registers may comprise a certain number $N_R$ of array vector registers, ZAR0-ZAR ($N_R$-1), as also shown in FIG. 2. The array vector registers ZAR forming the array register storage 110 may be a distinct set of registers from the vector registers Z0-Z31 used for SIMD processing and vector inputs to array processing. Each of the array vector registers ZAR may have the vector length MVL, so each array vector register ZAR may store a 1D vector of length MVL, which may be partitioned logically into a variable number of data elements. For example if MVL is 512 bits then this could be a set of 64 8-bit elements, 32 16-bit elements, 16 32-bit elements, 8 64-bit elements or 4 128-bit elements, for example. It will be appreciated that not all of these options would need to be supported in a given implementation. By supporting variable element size this provides flexibility to handle calculations involving data structures of different precision. To represent a 2D array of data, a group of array vector registers ZAR0-ZAR($N_R$-1) can be logically considered as a single entity assigned a given one of the array register identifiers ZA0-ZA($N_A$-1), so that the 2D array is formed with the elements extending within a single vector register corresponding to one dimension of the array and the elements in the other dimension of the array striped across multiple vector registers.

It can be useful, although not essential, to arrange the array registers ZA so that they store square arrays of data where the number of elements in the horizontal direction equals the number of elements in the vertical direction. This can help to support on-the-fly transposition of arrays where the row/column dimensions of an array structure in memory can be switched on transferring the array structure between the array registers 110 and memory, by providing support to read/write the array registers 110 either in the horizontal direction or in the vertical direction. By providing support to write/read data from a 2D array register in either the horizontal direction or the vertical direction this can allow data loaded in from memory in one direction (e.g. row by row) to be written back to memory in the opposite direction (e.g. column by column), faster than would be possible with a number of gather/scatter load/store or permute operations to transfer data between memory and vector registers.

Figure 3A:
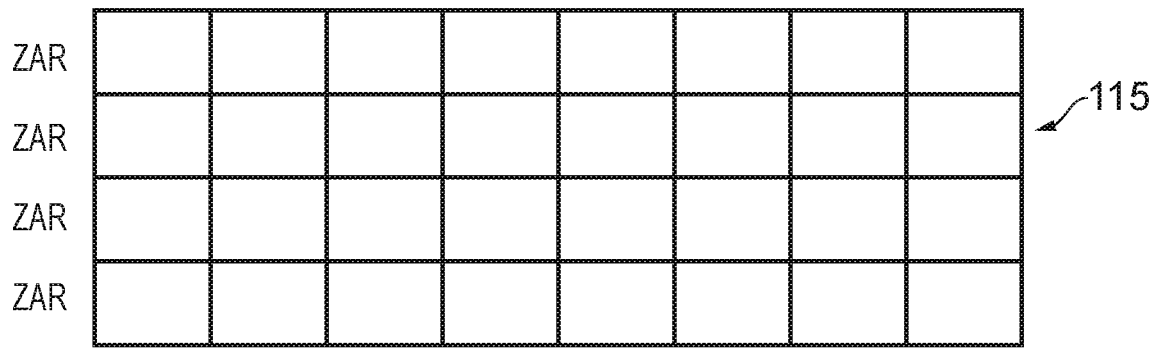
FIGS. 3A and 3B illustrate examples where a given 2D array of data elements may be either non-square or square.
Figure 3B:
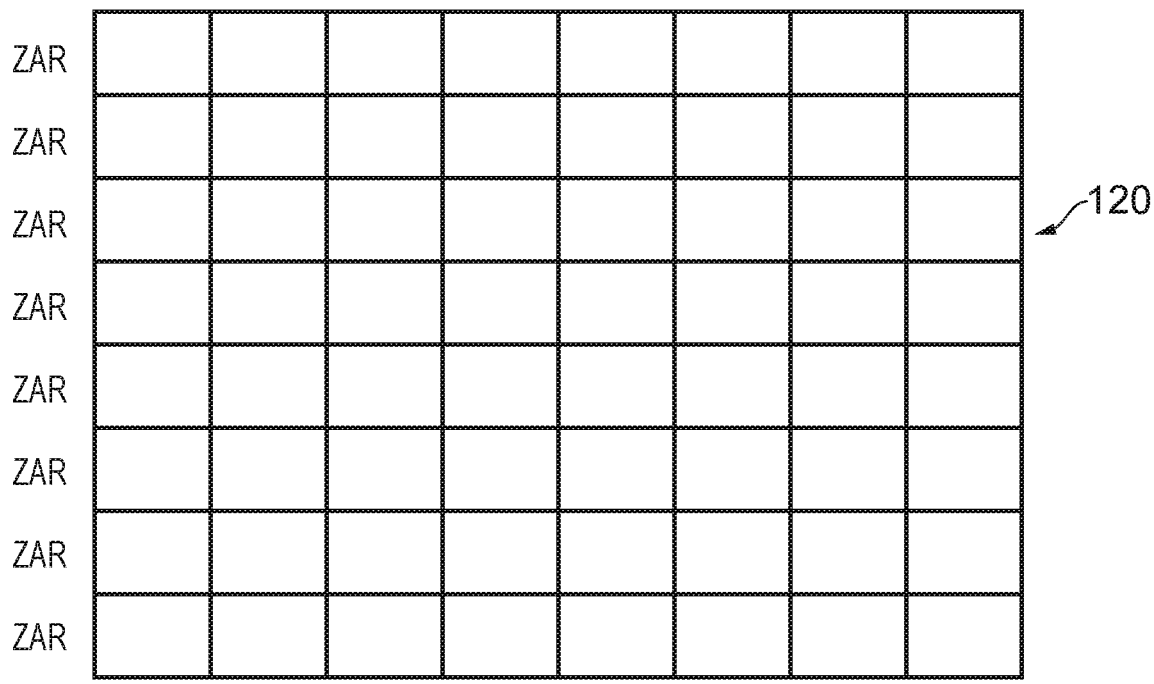

As mentioned above, a given 2D array of data elements may form a square array in some example implementations, but this is not a requirement. Hence as shown in FIG. 3A, in one example implementation a given 2D array of data elements 115 may form a non-square array. Alternatively, as shown in FIG. 3B, a given 2D array of data elements 120 may form a square array. In each of FIGS. 3A and 3B, an individual square box denotes a data element, and in some implementations the data element size may vary. In either example, the two-dimensional array of data elements can be specified in a variety of ways, but in one example implementation, as shown in FIGS. 3A and 3B, the given 2D array of data elements may be specified by a sequence of array vector registers (ZARs).

Figure 4A:
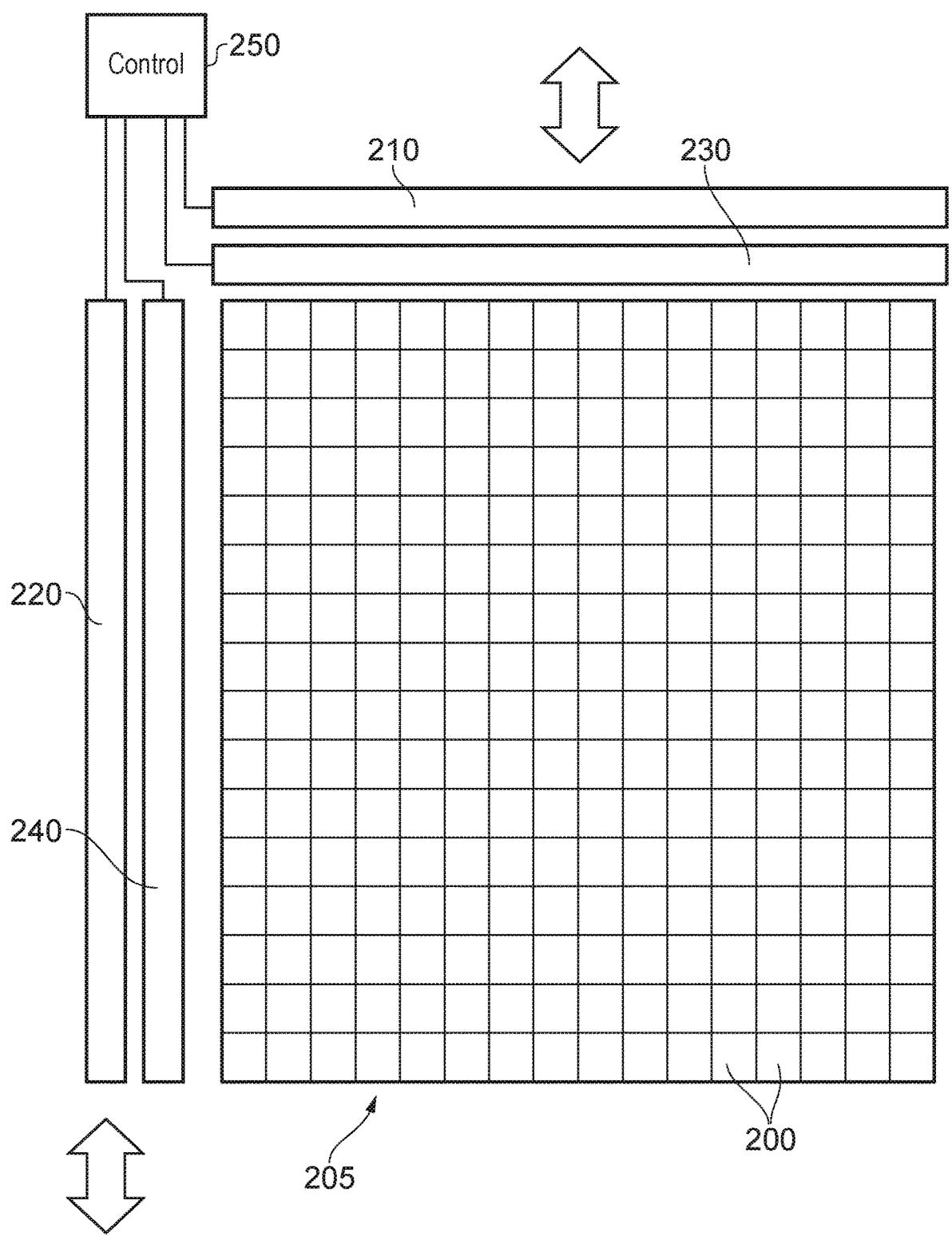
FIGS. 4A and 4B schematically illustrates how accesses may be performed to a square 2D array within the array storage in accordance with one example implementation.

As discussed above, the processing circuitry 60 is arranged, under control of instructions decoded by decoder circuitry 50, to access the scalar registers 70, the vector register 80 and/or the array storage 90. Further details of this latter arrangement will now be described with reference FIG. 4A, which merely provides one illustrative example of how the array storage may be accessed, in particular considering access to a square 2D array within the array storage.

In the illustrated example, a square 2D array within the array storage 90 is arranged as an array 205 of n×n storage elements/locations 200, where n is an integer greater than 1. In the present example, n is 16 which implies that the granularity of access to the storage locations 200 is $\frac{1}{16}^{th}$ of the total storage in either horizontal or vertical array directions.

From the point of view of the processing circuitry, the array of n×n locations are accessible as n linear (one-dimensional) vectors in a first direction (for example, a horizontal direction as drawn) and n linear vectors in a second array direction (for example, a vertical direction as drawn). Hence, the n×n storage locations are arranged or at least accessible, from the point of view of the processing circuitry 60, as 2n linear vectors, each of n data elements.

The array of storage locations 200 is accessible by access circuitry 210, 220, column selection circuitry 230 and row selection circuitry 240, under the control of control circuitry 250 in communication with at least the processing circuitry 60 and optionally with the decoder circuitry 50.

Figure 4B:
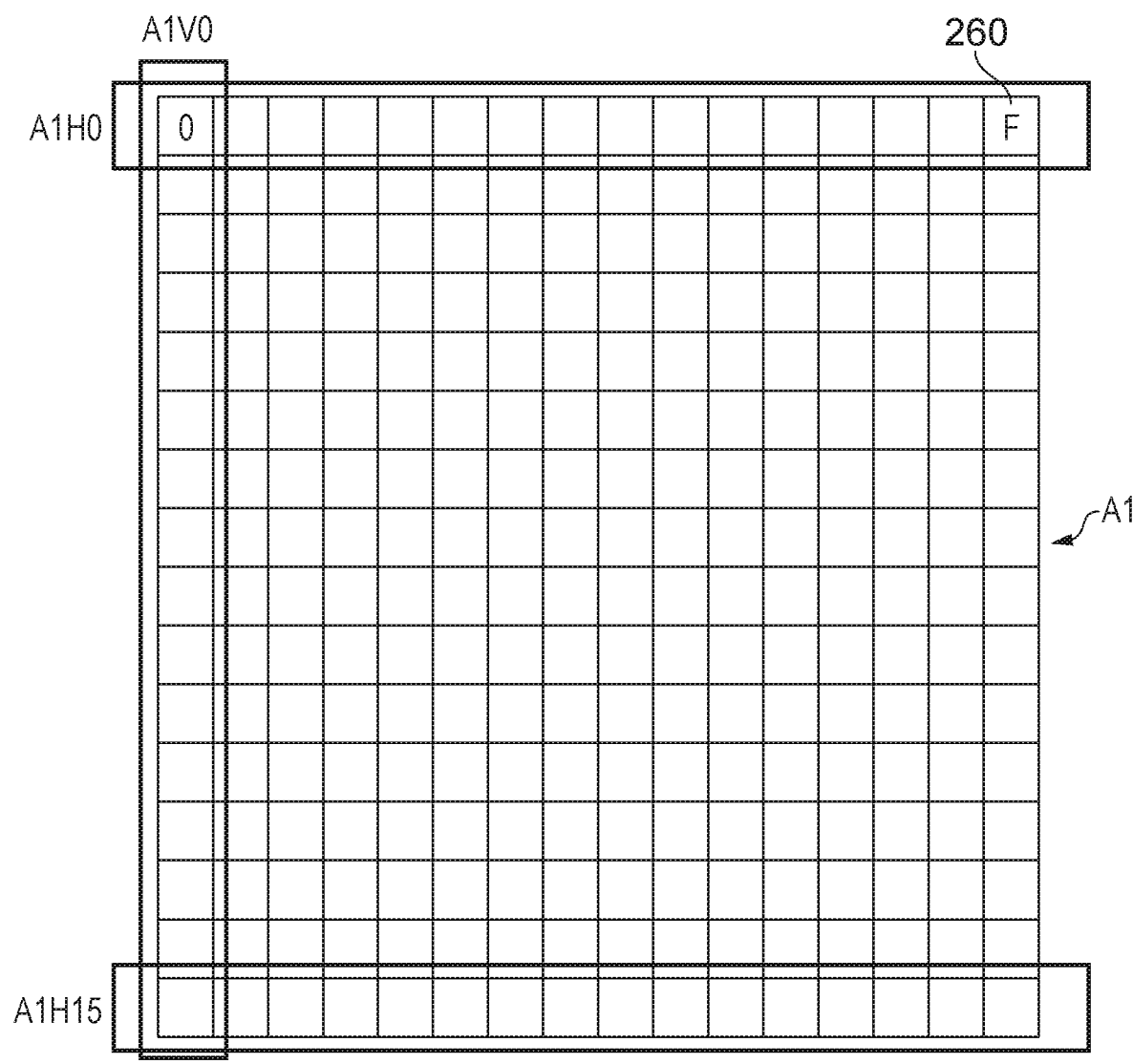

With reference to FIG. 4B, the n linear vectors in the first direction (a horizontal or "H" direction as drawn), in the case of an example square 2D array designated as "A1" (noting that as discussed below, there could be more than one such 2D array provided within the array storage 90, for example A0, A1, A2 and so on) are each of 16 data elements 0 . . . F (in hexadecimal notation) and may be referenced in this example as A1H0 . . . . A1H15. The same underlying data, stored in the 256 entries (16×16 entries) of the array storage 90 A1 of FIG. 4B, may instead be referenced in the second direction (a vertical or "V" direction as drawn) as A1V0 . . . A1V15. Note that, for example, a data element 260 is referenced as item F of A1H0 but item 0 of A1V15.

Note that the use of "H" and "V" does not imply any spatial or physical layout requirement relating to the storage of the data elements making up the array storage 90, nor does it have any relevance to whether the 2D arrays within the array storage store row or column data in any example application.

As discussed earlier, use of the array storage 90 can significantly improve performance in relation to certain types of operations, for example accumulate operations where a plurality of iterations of such accumulate operations may be performed on a given two-dimensional array of data elements within the array storage 90, with the two-dimensional array of data elements being used to accumulate the results when performing those accumulate operations. However, once those accumulate operations are complete, an efficient mechanism would be desirable for moving the resultant vectors of data elements out of the array storage, and preparing the associated storage elements within the array storage so that they can be used for subsequent accumulate operations.

As discussed earlier, in one example implementation this is achieved through the use of a move and zero instruction that identifies one or more vectors of data elements of a given two-dimensional array of data elements within the array storage 90. When such a move and zero instruction is decoded, the processing circuitry 60 is then controlled to move the data elements of the one or more identified vectors from the array storage to a destination storage (which could for example be one or more vector registers within the vector register file 80), and also to set to a logic zero value the storage elements of the array storage that were being used to store the data elements of the one or more identified vectors.

FIG. 5A schematically illustrates fields that may be provided within the move and zero instruction in accordance with one example implementation. An opcode field 305 is used to identify the instruction as a move and zero instruction. In some example implementations, there may be different variants of the move and zero instruction provided, and hence more than one different opcode that may identify a move and zero instruction. As one particular example, there may be one variant defined for the move and zero instruction when it is used to move the identified vectors within the array storage to target vector registers within the vector register file 80, and a different variant may be provided when one or more vectors within the array storage are to be moved to memory (in this latter case the instruction may for example be referred to as a store and zero instruction).

A vector identification field 310 is also provided in order to identify the one or more vectors within the array storage that are to be subjected to the move operation. In some instances, only a single vector may be identified, but in other instances multiple vectors may be identified by this field. In the latter case, those multiple vectors could all be identified independently in one example implementation, but in another example implementation the multiple vectors may be inferred, for example from an indication of a first vector and an indication of the number of vectors to be moved.

As shown in FIG. 5A, a destination storage identification field 315 is also provided within the move and zero instruction, to identify the destination storage to which the vector(s) should be moved. In one example implementation, this field is used to identify one or more vector registers in the vector register file 80, and in the example where multiple such vector registers are identified, they may be identified in an analogous way to that in which the multiple vectors are identified by the vector identification field (for example a first vector register may be identified, with the other vector registers then being implicit based on knowledge of the number of vector registers that are required to form the destination storage). In an alternative implementation, where the one or more vectors within the array storage are to be moved to memory, then the information provided in the destination storage identification field 315 can be arranged to identify the locations in memory to which the data elements of the one or more vectors should be stored. This could for example involve identifying one or more registers whose contents are used to identify the required locations in memory.

If desired, one or more optional additional fields 320 may be provided within the instruction 300. For example, a predicate field may be used to identify predicate information used to control which data elements within the one or more identified vectors are to be subjected to the move and zero operation. This provides flexibility by allowing the operation to be applied in respect of certain data elements, but not in respect of others. As another example, a data element size indication may be provided within the instruction, thereby allowing the instruction to be applied in respect of vectors whose data element size is not fixed.

In one example implementation the move and zero instruction may be arranged to operate on array vector registers extending in a first array direction, and in those implementations there will not be a need to enable both horizontal and vertical directions to be encoded within the vector identification field 310. However, in examples where the 2D arrays within the array storage 90 can be accessed in either horizontal or vertical directions (in one such implementation the 2D arrays being square arrays), then the vector identification field can take the form shown in FIG. 5B. In particular, this vector identification field 310' may include a first sub-field 312 used to identify the given square 2D array within the array storage 90 that is to be accessed, and a second sub-field formed of two parts 313 and 314. The first part 313 provides one or more line identifiers to identify one or more lines of data elements within the square 2D array, and the second part 314 provides an array direction indication, thus enabling a determination as to whether the lines of data elements identified by the line identifiers extend in the horizontal directional or the vertical direction. It will be appreciated that the combination of the first part 313 and the second part 314 enable one or more vectors within the square 2D array to be identified.

Figure 6:
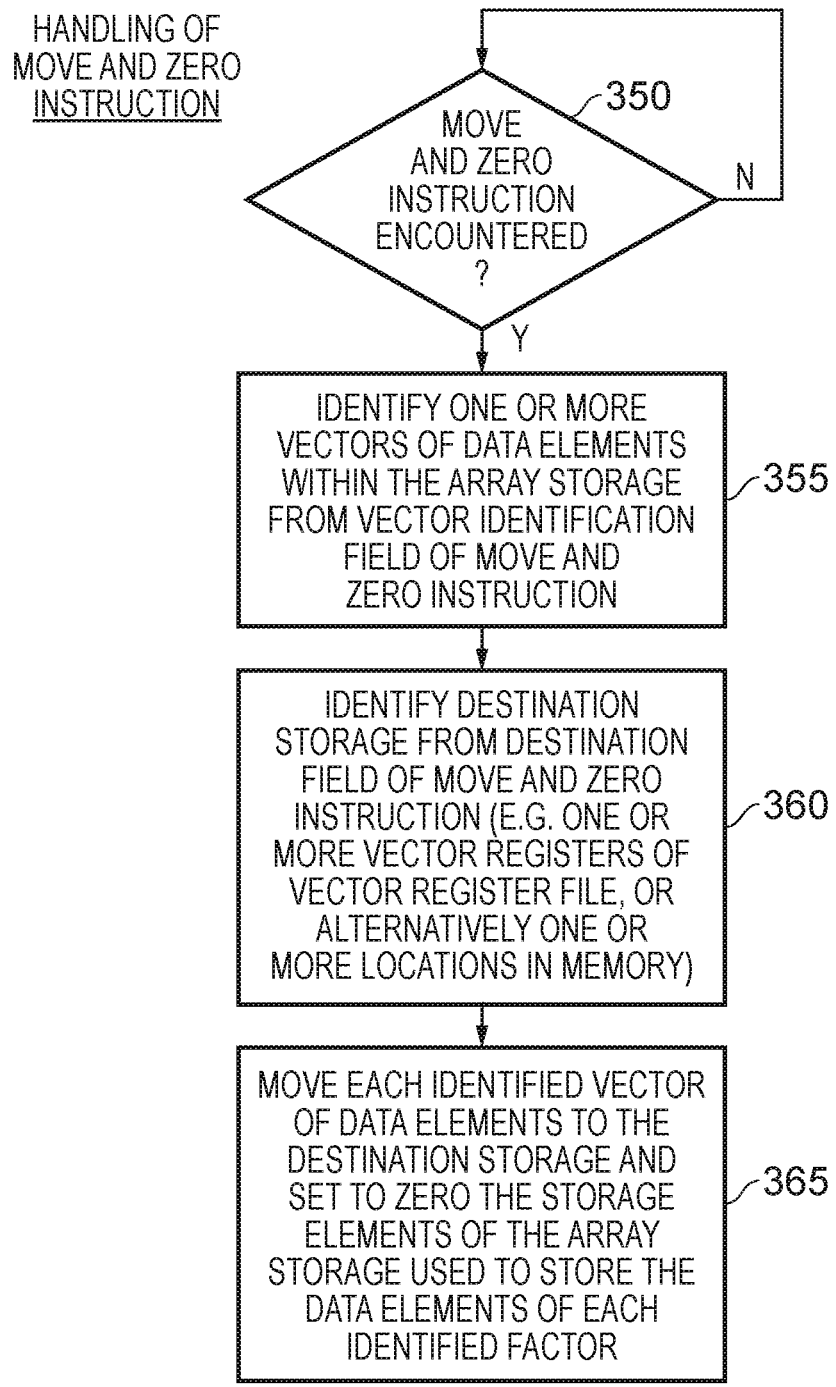
FIG. 6 is a flow diagram illustrating how a move and zero instruction may be handled in accordance with one example implementation.

FIG. 6 is a flow diagram illustrating the operation of the move and zero instruction. At step 350, when it is determined that a move and zero instruction has been encountered by the decoder circuitry 50, then at step 355 one or more vectors of data elements within the array storage are identified from the information provided in the vector identification field 310 of the move and zero instruction. Further, at step 360 the destination storage to be used is identified from the destination storage identification field 315 of the move and zero instruction. As mentioned earlier, this step may typically cause one or more vector registers in the vector register file 80 to be identified as the destination for the data elements moved out of the array storage, but alternatively in some implementations it may be the case that the destination storage identified takes the form of one or more locations in memory. In one example implementation, steps 355 and 360 may be performed by the decoder circuitry 50, but in an alternative implementation the processing circuitry 60 may perform those determination steps based on the information provided by the decoder circuitry 50.

At step 365, the processing circuitry 60 is used to move each identified vector of data elements to the destination storage, and then to set to zero the relevant storage elements of the array storage, i.e. those storage elements that were used to store the data elements that have now been moved to the destination storage.

FIG. 7 illustrates an example instruction sequence that may be operating on the array storage 90 in one example implementation. As shown in the example of FIG. 7, a series of data processing instructions (in this example three instructions) may be performed in order to perform processing and accumulate operations within a given 2D array provided within the array storage. During the performance of these multiple instructions, the results are accumulated within the given 2D array.

In this example, it is assumed that once the third data processing instruction has been completed, then the first vertical vector within the given 2D array stores final accumulate results, whereas other vertical vectors within the given 2D array at this stage only store intermediate accumulate results. Given that the first vertical vector stores final accumulate results, it would be useful to move those results out of the array storage so as to free up the storage elements of that first vertical vector for use in subsequent processing and accumulate operations.

As shown in FIG. 7, this is achieved by executing a move and zero instruction, identifying vertical vector 1 and defining a destination vector register to which the contents of that vertical vector should be moved, in this example that vector register being referred to as register $Z_i$. Execution of this instruction causes the final accumulate results in the vertical vector 1 to be moved into the identified vector register, and the associated storage elements within the given 2D array (i.e. those implementing the vertical vector 1) to be cleared to a logic zero value. As a result of execution of this single instruction, not only have the final accumulate results been moved out of the array storage, but also the underlying storage elements have been prepared so that they are immediately available for reuse in subsequent processing and accumulate operations. In particular, by clearing their contents to 0, they can immediately begin to be specified as the destination for new accumulation results produced by subsequent instructions. Hence, as shown in FIG. 7, when a subsequent data processing instruction 4 is executed, this can accumulate into the 2D array, and if desired can reuse the vertical vector 1. Once that data processing instruction has been executed, it is assumed that the vertical vector 2 now holds final accumulate results, and accordingly an additional move and zero instruction can be executed in order to move the contents of the vertical vector 2 within the given 2D array out of the array storage and into a destination vector register (in this example register $Z_{i+x}$). Again, execution of this instruction causes the contents of the identified vector to be moved out of the array storage, and for the corresponding storage elements to be cleared to logic zero values, hence freeing up those storage elements for use in subsequent processing and accumulate operations. Hence, as shown in FIG. 7, a subsequent iteration of the data processing instruction can then be executed, and if desired can reuse the vertical column 2.

There are various types of operation that may be performed using a given 2D array within the array storage 90 to accumulate results, where not all of the vectors within that given 2D array will necessarily hold final accumulate results at the same time. In such situations, it can be useful to adopt the approach illustrated schematically by way of example in FIG. 7, so as to free up resources within the 2D array for reuse. One example use case for such an approach is when performing 2D finite impulse response (FIR) filtering using a sliding window approach. Such an approach is shown schematically in FIG. 8, where an input image 400 is considered. In particular, an FIR filtering operation is applied to the input image in order to produce a corresponding output image 430, where each pixel 415, 420 in the output image 430 is produced as a result of a corresponding filtering operation 407, 412. For each of those filtering operations, multiple input pixels are considered, and filtering coefficients are applied in respect of those multiple input pixels in order to generate the value for the output pixel.

Figure 8:
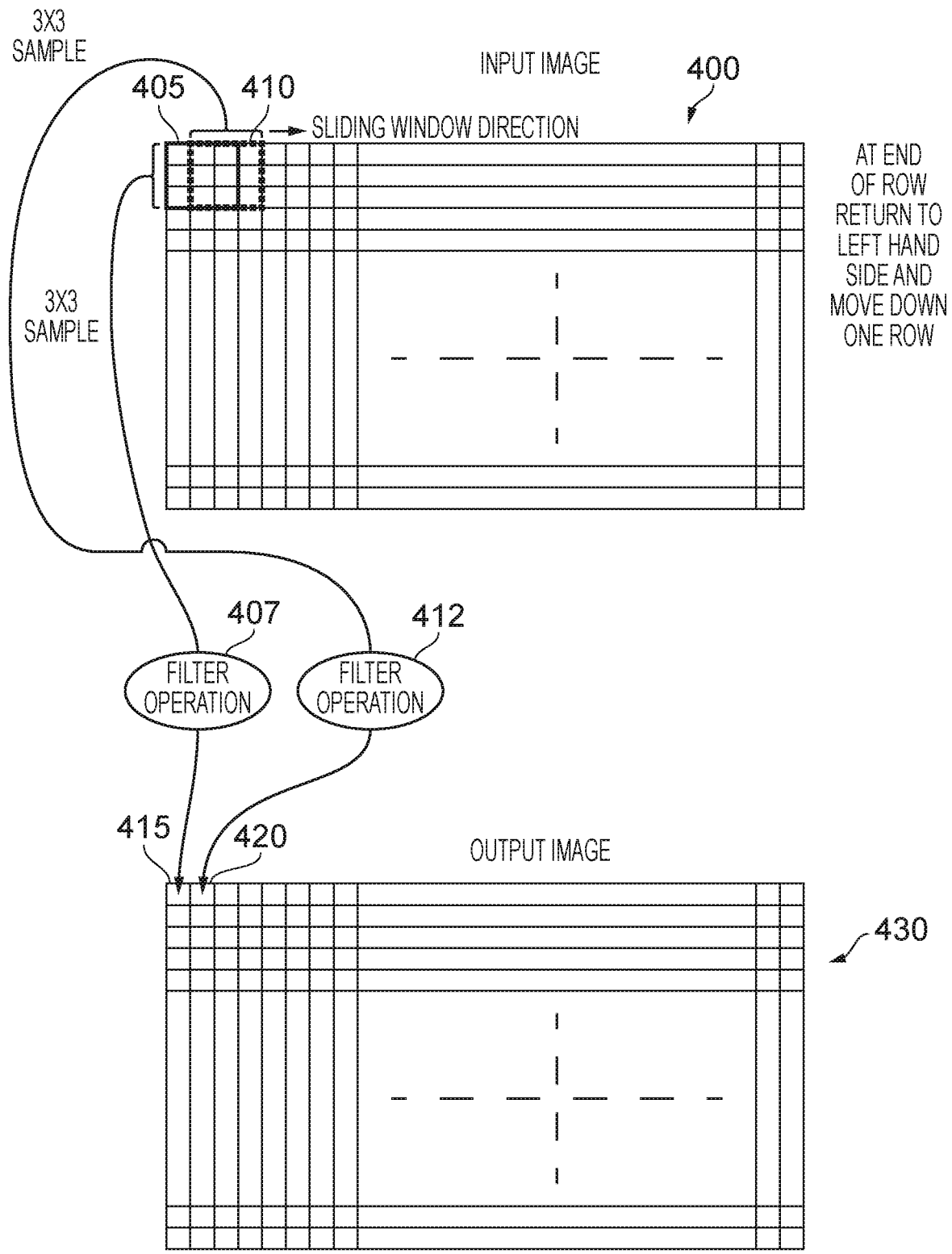
FIG. 8 schematically illustrates a finite impulse response (FIR) filtering operation that may be performed.

In the example shown in FIG. 8, it is assumed that each output pixel is generated by considering a 3×3 array of input pixels. Hence, a first 3×3 array of input pixels 405 is provided to the filter operation 407, where performs filtering using a corresponding array of filter coefficients in order to produce an output value for the pixel 415. Similarly, a second 3×3 array of input pixels 410 is subjected to a filter operation 412 using a corresponding set of filter coefficients in order to produce the value for the output pixel 420. It will be appreciated that the array 410 is shifted one pixel position to the right with respect to the array 405, and as the above described process is repeated a sliding window of 3×3 pixels can be extracted to serve as the inputs to each filter operation. When the end of a row is reached, the process can return to the left-hand side of the input image, but starting at one row lower down in the image, and again proceed from the left to the right of the image. Hence, it will be appreciated that there is effectively a sliding window moving first in a "horizontal" direction in the arrangement shown in FIG.

8, that moves over the input image extracting 3×3 arrays of input image pixels to be used when computing each output image pixel.

FIGS. 9A to 9D illustrate how such a 2D image filtering operation can be efficiently performed using a square 2D array within the array storage 90, and by performing outer product accumulate operations on the data held in that 2D array. Note that in the example illustrated in FIGS. 9A to 9D, the sliding window will move first in a "vertical" direction, i.e. in a direction orthogonal to that shown in the FIG. 8 example. Hence, the input image 440 as illustrated in FIGS. 9A to 9D can be considered as being on its side relative to its normal viewing direction.

As shown in FIGS. 9A to 9D, one column of the input image 440 (or part of an image) is processed at a time, and subjected to a filtering operation using a vector of filter coefficients. Each block within a vector of filter coefficients (see for example block 465 in FIG. 9A) represents three filter coefficients from a 3×3 array of coefficients. The padding elements (see for example element 467 in FIG. 9A) correspond to zeros or undefined values and are merely an artefact of the implementation illustrated. In particular, in the implementation illustrated the instructions used can perform four multiplications and accumulation per result, but it is only required to perform three multiplications and accumulation in the example implementation shown.

In the example illustrated four sets of coefficients (see for example the four blocks 468 in FIG. 9A taken from one row of four sets of 3×3 coefficients) are used as an input in order to compute four output vectors for the provided input vector (one set of (3+1) coefficients being employed in each of four multiplication operations used to produce the four output vectors). In addition, the process illustrated in FIGS. 9A to 9D only uses one column of three coefficients from each 3×3 array of coefficients per instruction, and hence it takes three instructions in order to produce the final accumulate results within any particular set of four vectors.

When the process is underway and in a steady state, then as will be discussed later with reference to FIGS. 9C and 9D the process is operating on three sets of four output vectors at the same time (see for example the three sets of output vectors 475, 485, 495 shown in FIG. 9C).

Figure 9A:
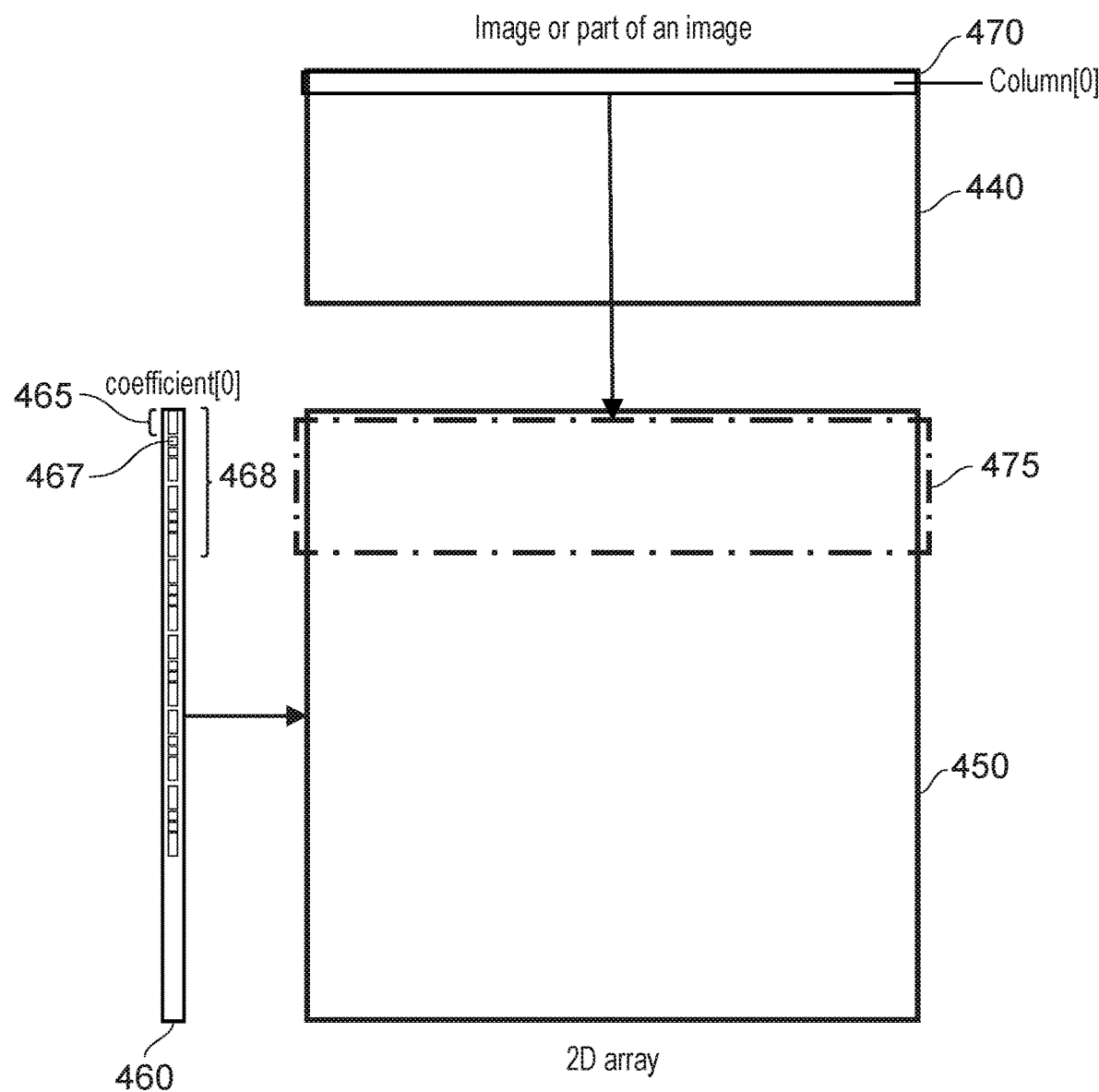
FIGS. 9A to 9D illustrate how the array storage may be used when performing a 2D image filtering operation in accordance with one example implementation.
Figure 9B:
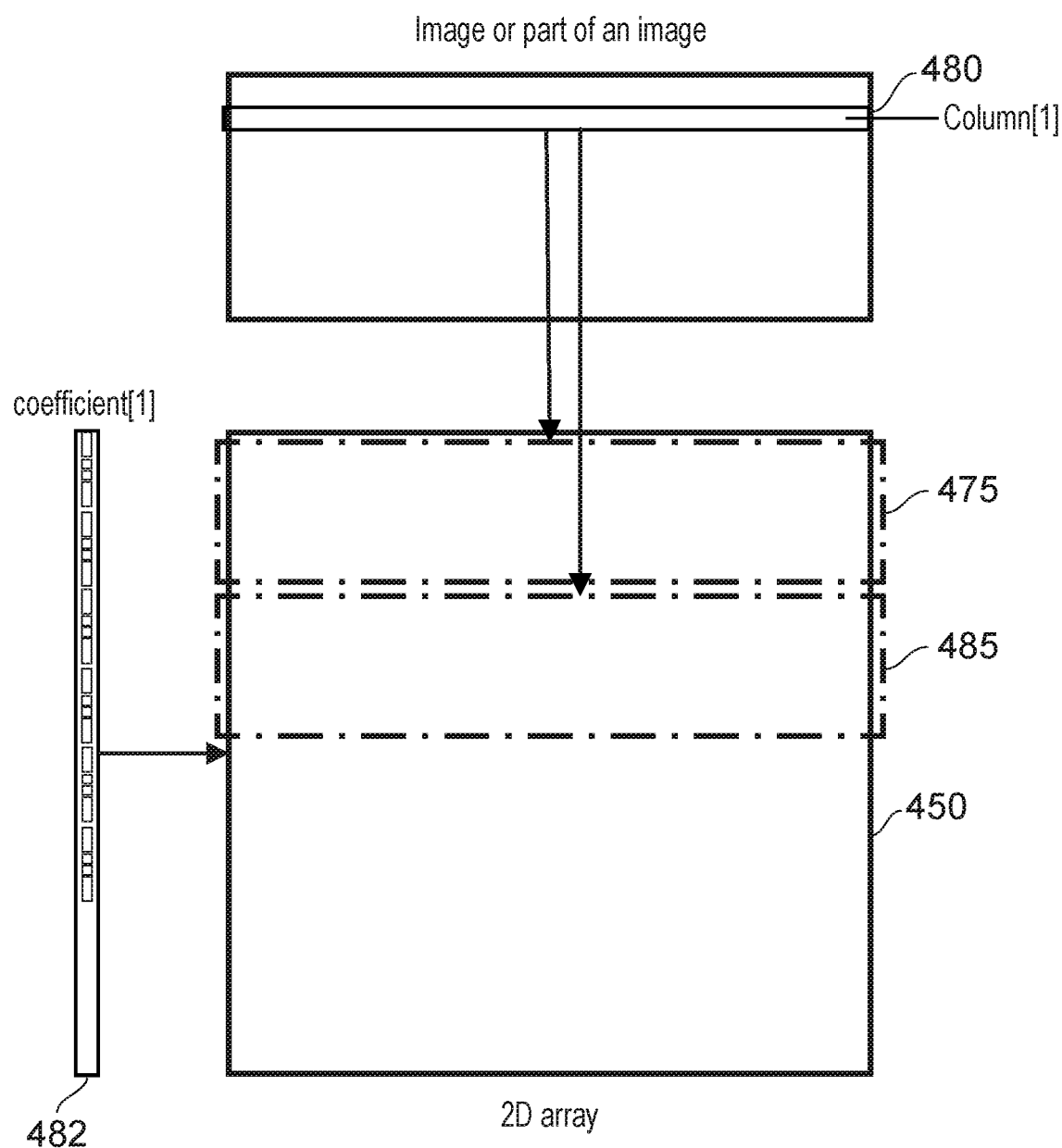
Figure 9C:
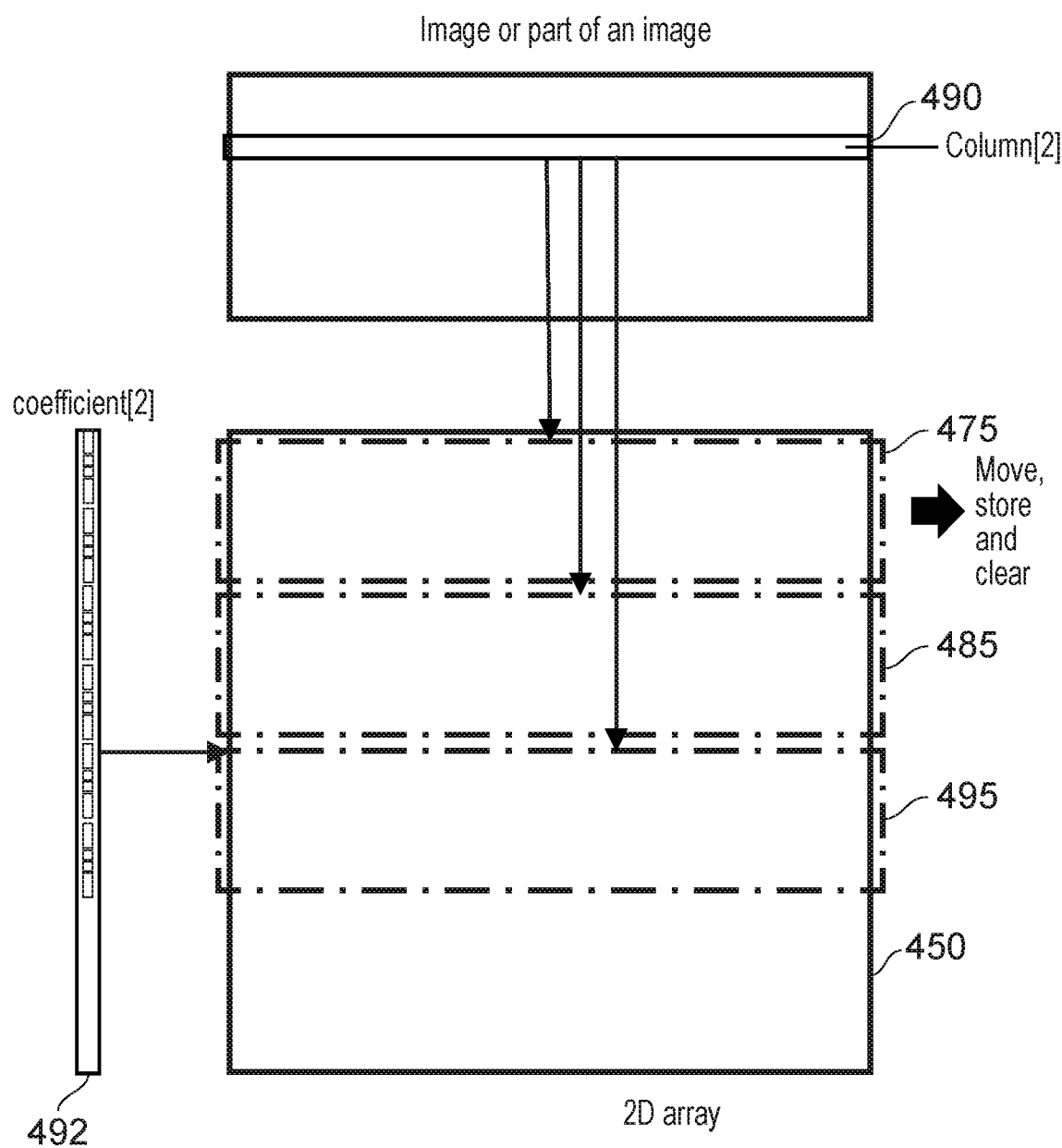

As shown in FIG. 9A, when the first column 470 of the input image 440 is processed using the vector of coefficients 460, this causes accumulate results to be stored within the four vectors 475. As shown in FIG. 9B, when the second column 480 of the input image 440 is processed using the vector of coefficients 482, this populates accumulate results within both the four vectors 475 and the four vectors 485. Then, when the third column 490 is processed as shown in FIG. 9C, using the vector of coefficients 492, this causes accumulate results to be populated within the four vectors 475, the four vectors 485 and the four vectors 495. From the earlier discussion of FIG. 8, it will be appreciated that at this point all of the pixels within the first three columns of the input image will have been processed, and accordingly the contents of the four horizontal vectors 475 will represent final accumulate results for the first group of columns of the output image. Accordingly, as shown in FIG. 9C, the contents of those four registers 475 can be subjected to the earlier described move and zero instruction in order to move those contents to a destination storage, for example four vector registers within the vector register file 80, and to clear the storage elements forming those four vectors 475 within the 2D array 450 so that they are available for subsequent accumulate operations.

Figure 9D:
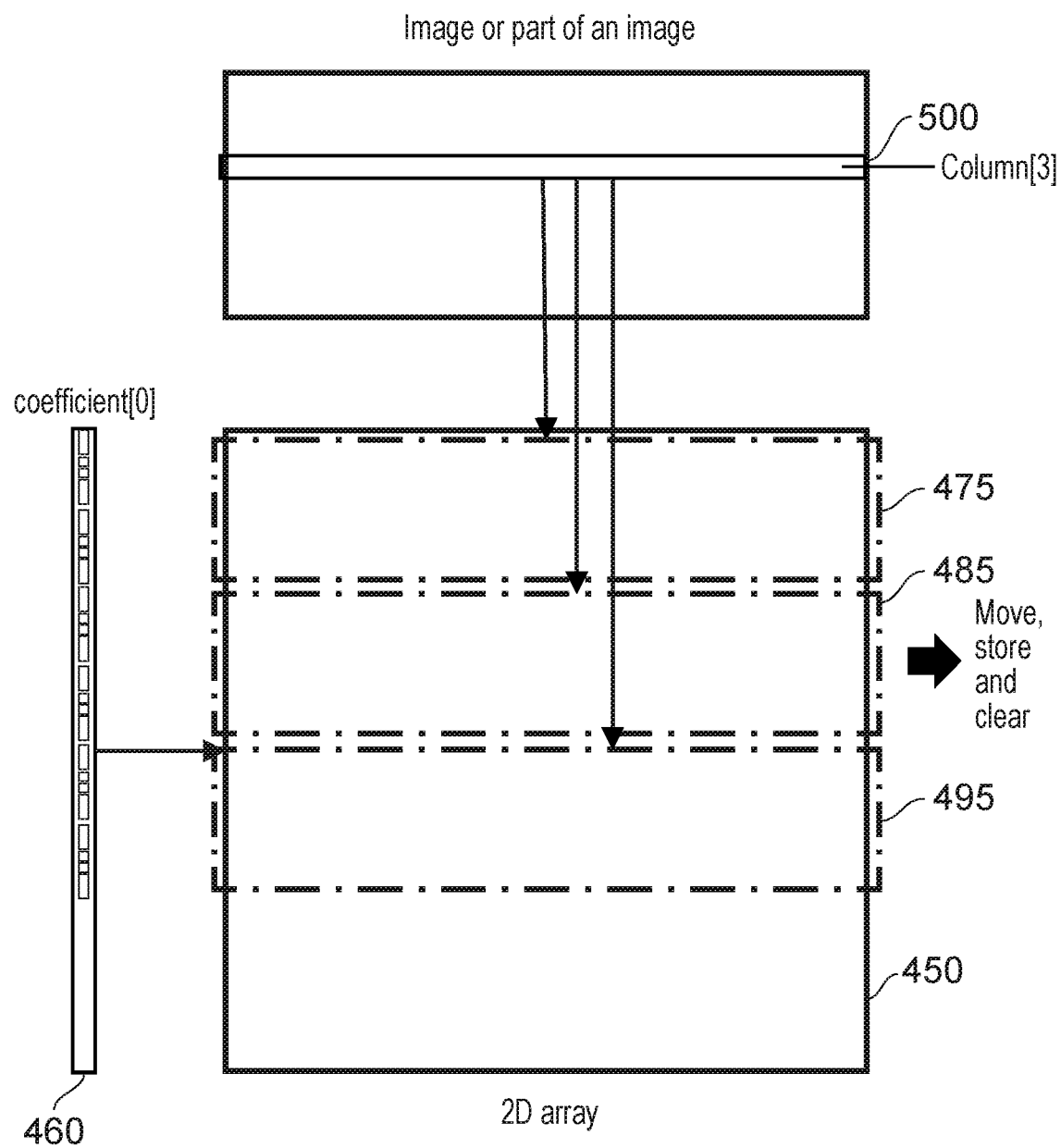

Hence, by way of example, as shown in FIG. 9D, when the fourth column 500 of the input image 440 is processed, using the vector of coefficients 460, this can cause accumulate results to be populated within the four vectors 485, the four vectors 495, and the four vectors 475 (which can now be re-used due to the storage elements in those vectors having been cleared to logic zero values by the previous move and zero instruction). As also shown in FIG. 9D, the four vectors 485 will now store final accumulate results representing the second group of columns of the output image (since at this point each of the second, third and fourth input columns will have been processed). Accordingly, the data elements stored within those four horizontal vectors 485 can be moved out of the array into vector registers of the vector register file, and then the underlying storage elements cleared to allow their re-use in subsequent accumulate operations.

Whilst in FIGS. 9A to 9D any vectors subjected to the move and zero instruction are immediately reused (since this can result in easier programming), there is no requirement for the cleared vectors to be reused immediately, and instead the processing could continue to consume vectors below the groups of vectors 475, 485, 495 if desired, only returning to the beginning when the bottom of the array 450 has been reached.

In one example implementation, a given square 2D array within the array storage 90 may be accessed in either the horizontal or vertical directions. However, in some implementations, there are certain processing operations that can be performed using 2D arrays within the array storage 90 where the vectors are only accessed in one of the directions. Hence, by way of example, referring back to the early-discussed FIG. 2, there may be some processing instructions that specifically identify the array vector registers ZAR extending in a first array direction through the array. These instructions can allow for a highly efficient performance of certain processing and accumulate operations, by specifying multiple of the ZAR registers on which the associated processing and accumulate operations are to be performed. However, once a series of those instructions has been executed, all of the identified array vector registers ZAR will typically include final accumulate results, but it will not be possible to reuse those registers for subsequent processing and accumulate operations until those results have been moved out of the array storage and the current contents of the storage elements forming those array vector registers have been cleared to a logic zero value.

FIG. 10 schematically illustrates how the earlier-described move and zero instruction can be used to significantly increase performance in such situations. In particular, as shown in FIG. 10, it is assumed that three array vector registers ZAR2, ZAR3 and ZAR4 are initialised to 0, and then a series of data processing instructions of the above type are performed in order to perform processing and accumulate operations, with the accumulate results being maintained within the above three array vector registers. Once the series of data processing instructions required has been completed (in this example it being assumed that there are two such data processing instructions executed), then all of the above three array vector registers will store final accumulate results. The earlier-mentioned move and zero instruction can hence be used to specify those three array vector registers as the vectors whose data elements should be moved to a destination storage, and can also identify the storage to be used as the destination storage, in this example it being assumed that three adjacent vector registers within the vector register file 80 are used. Hence, execution of the move and zero instruction will cause all of the accumulate results to be moved out of the array storage into the identified vector registers of the vector register file, and also cause the storage elements forming those three array vector registers to be cleared to a logic zero value. Hence, as shown in FIG. 10, the process can then immediately proceed to execute a sequence of subsequent data processing instructions that will also accumulate into the same series of array vector registers ZAR2, ZAR3 and ZAR4. This provides a highly efficient implementation.

In accordance with another technique described herein, an additional new form of instruction (referred to herein as a zero vectors instruction) is provided that can also be used to zero vectors of data elements within the array storage, and to provide for an improvement in performance when performing accumulate operations using such an array storage (when compared with an implementation that would need to use a move instruction to pass zeros from one or more vector registers into the desired vectors of the array storage, and would need to reserve one or more vector registers to hold those zero values). In accordance with this additional technique, the instruction decoder circuitry 50 is arranged, in response to decoding such a zero vectors instruction (which is arranged to identify multiple vectors of data elements of a given two dimensional array of data elements within the array storage), to also decode a subsequent accumulate instruction arranged to operate on the identified multiple vectors of data elements. Then the processing circuitry is caused to set to a logic zero value the storage elements of the array storage used to store the data elements of the identified multiple vectors, and then to perform an accumulate operation specified by the accumulate instruction to produce result data elements for storing in the identified multiple vectors within the array storage.

By use of the above approach, the zero vectors instruction can be merged, at the time of decoding by the instruction decoder circuitry, with a subsequent accumulate instruction that specifies the same multiple vectors of data elements as specified by the zero vectors instruction, to in effect create a non-accumulating variant of that accumulate instruction. This can be highly beneficial, as instruction encoding space is usually at a high premium, and it may not be possible to specify non-accumulating variants of the various accumulate instructions that may be defined to operate on multiple vectors of data elements within the array storage.

Figure 11:
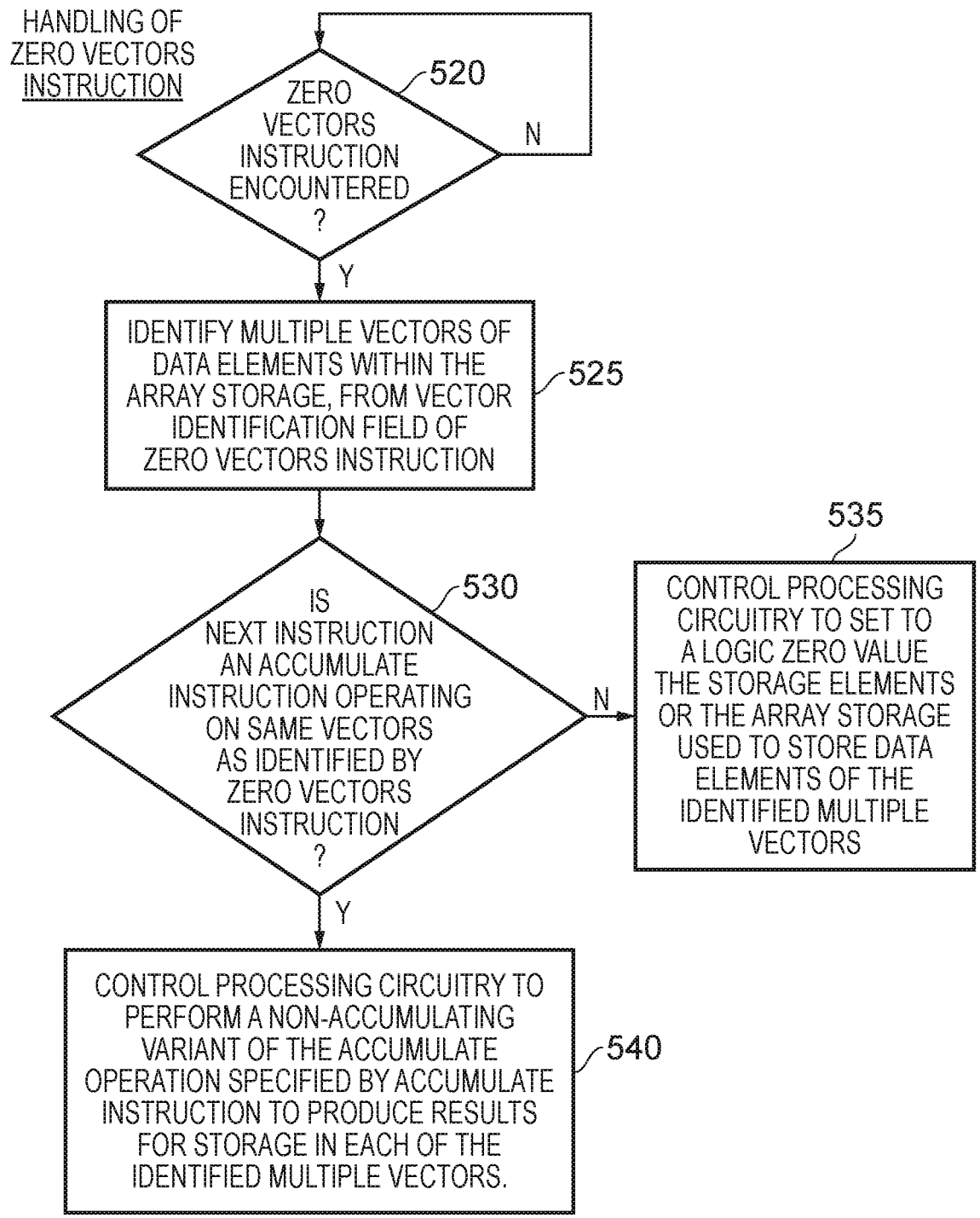
FIG. 11 is a flow diagram illustrating how a zero vectors instruction may be handled in accordance with one example implementation.

FIG. 11 is a flow diagram illustrating the handling of such a zero vectors instruction in accordance with one example implementation. When at step 520 a zero vectors instruction is encountered by the decoder circuitry 50, then at step 525 multiple vectors of data elements within the array storage are identified, with reference to the vector identification field of the zero vectors instruction. For example, multiple of the array vector registers ZAR could be identified in the vector identification field. Then, at step 530 the decoder circuitry determines whether the next instruction to be decoded is an accumulate instruction that is operating on the same vectors as identified by the zero vectors instruction.

If not, then at step 535 the processing circuitry is controlled to set to a logic zero value the storage elements of the array storage that are used to store the data elements of the identified multiple vectors determined at step 525, and thereafter processing merely continues with execution of the next instruction.

However, if at step 530 it is determined that the next instruction is an accumulate instruction that is operating on the same vectors as identified by the zero vectors instruction, then the decoder effectively fuses the two instructions, and at step 540 controls the processing circuitry to perform a non-accumulating variant of the accumulate operation specified by the accumulate instruction (typically this involving both a processing operation and a subsequent accumulate) in order to produce results for storage in each of the identified multiple vectors. As mentioned earlier, by such an approach, there is no need to specifically encode a non-accumulating variant of any accumulate instruction that is arranged to operate on multiple vectors within the array storage, as such a non-accumulating variant can effectively be implemented by the above fuse procedure through use of a zero vectors instruction followed by the required accumulate instruction (thereby implementing the processing operation defined by the accumulate instruction but with the accumulate function effectively being nullified).

Figure 12:
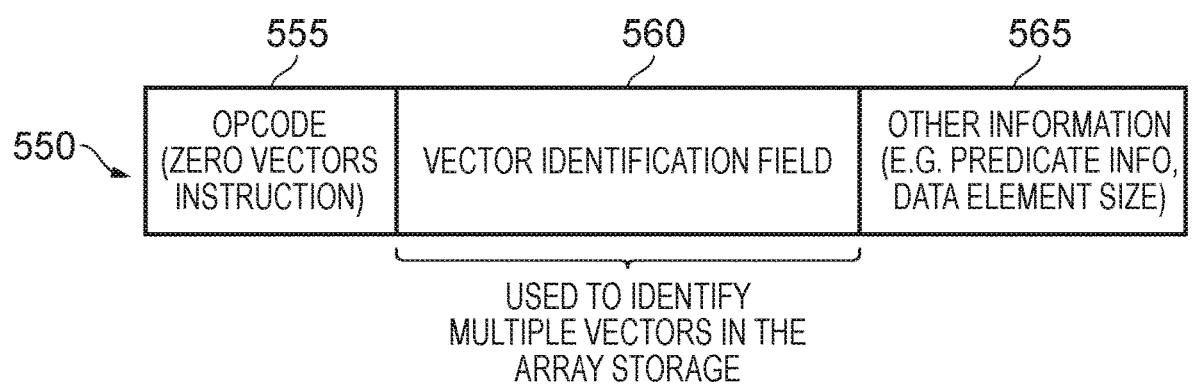
FIG. 12 schematically illustrates fields that may be provided within a zero vectors instruction in accordance with one example implementation.

FIG. 12 is a diagram schematically illustrating fields that may be provided within the zero vectors instruction in one example implementation. In particular, the zero vectors instruction 550 includes an opcode field 555 whose bits are used to identify that the instruction is indeed a zero vectors instruction. Further, a vector identification field 560 is provided that is used to identify the multiple vectors in the array storage. The information in this field can generally take the form discussed earlier when describing the vector identification field 310 of the move and zero instruction 300 of FIG. 5A, although in one example implementation the subsequent accumulate instructions are ones that are arranged to operate on array vector registers extending in a first array direction, and hence there will not typically be a need to enable both horizontal and vertical directions to be encoded within the vector identification field 560.

If desired, then as shown by box 565 certain optional additional fields may be provided, such as predicate information fields and data element size fields as discussed earlier with reference to the move and zero instruction example.

Figure 13:
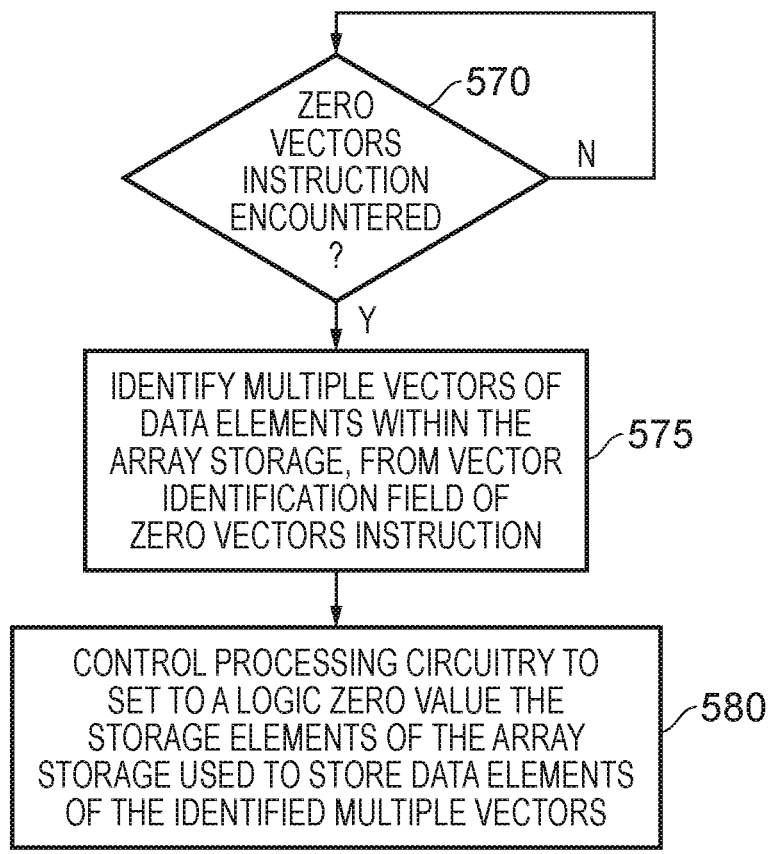
FIG. 13 is a flow diagram illustrating how the zero vectors instruction may be handled in accordance with an alternative example implementation.

FIG. 13 is a flow diagram illustrating the handling of the zero vectors instruction in accordance with another example implementation. When at step 570 a zero vectors instruction is encountered by the decoder circuitry 50, then at step 575 multiple vectors of data elements within the array storage are identified, with reference to the vector identification field of the zero vectors instruction. For example, multiple of the array vector registers ZAR could be identified in the vector identification field.

Then at step 580 the processing circuitry is controlled to set to a logic zero value the storage elements of the array storage that are used to store the data elements of the identified multiple vectors determined at step 575, and thereafter processing merely continues with execution of the next instruction.

Even in this implementation, when no fusing takes place to combine the zero vectors instruction with a subsequent accumulate instruction, significant benefits can still be achieved. In particular, there is no need to execute multiple move instructions, where each move instruction moves a vector of zeros from a vector register of the vector register file into an identified vector of the array storage. Further, such zeroing functionality is simpler and cheaper to construct in hardware than having to implement the move vector (of zeros) functionality. Furthermore, there is an additional saving because there is not a requirement to reserve one or more vector registers in the vector register file to hold the logic zero values that would be required were the above implementation based on the use of move instructions employed.

Figure 14:
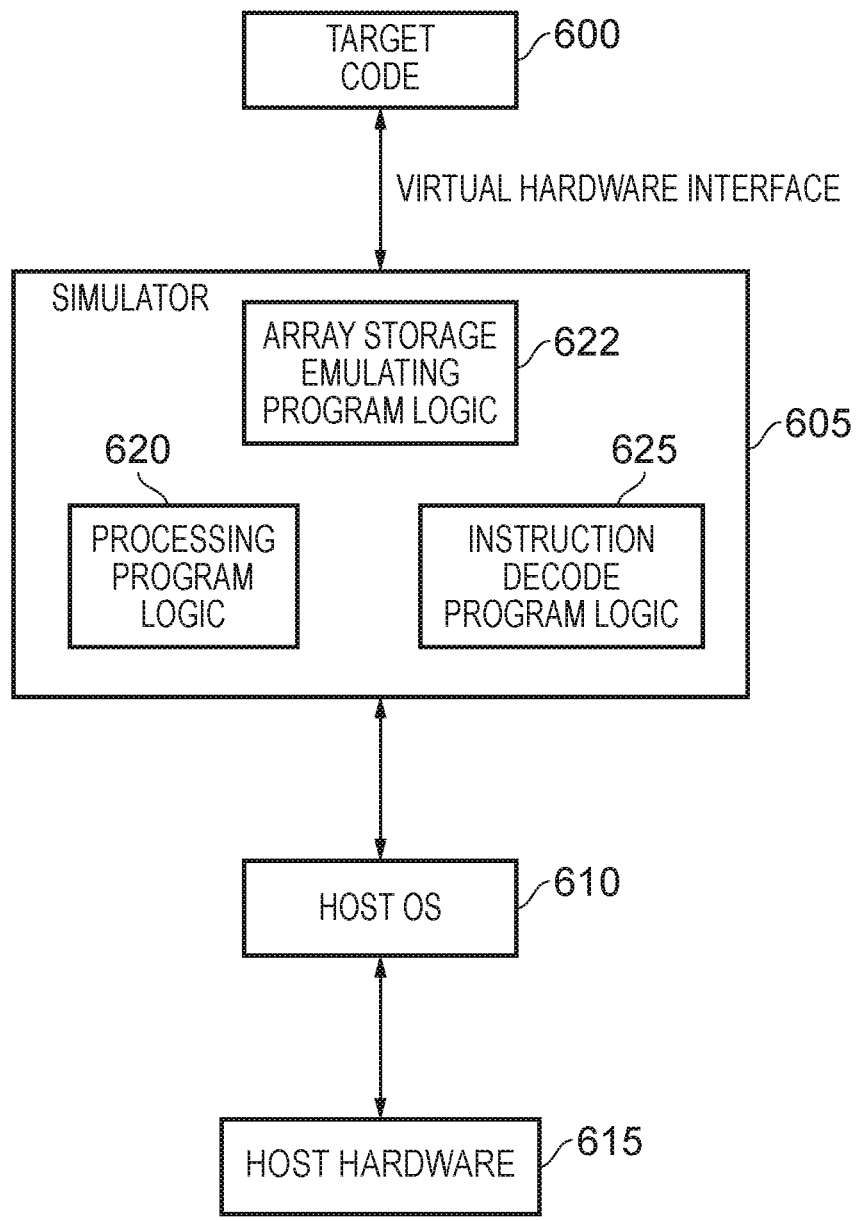
FIG. 14 illustrates a simulator implementation that may be used.

FIG. 14 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 615, optionally running a host operating system 610, supporting the simulator program 605. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 30 in the hardware apparatus 10 could be emulated as a simulated address space which is mapped on to the virtual address space used by the host operating system 610 by the simulator 605. In arrangements where one or more of the hardware elements referenced in the previously described examples are present on the host hardware (for example host processor 615), some simulated implementations may make use of the host hardware, where suitable.

The simulator program 605 may be stored on a computer readable storage medium (which may be a non-transitory medium), and provides a virtual hardware interface (instruction execution environment) to the target code 600 (which may include applications, operating systems and a hypervisor) which is the same as the hardware interface of the hardware architecture being modelled by the simulator program 605. Thus, the program instructions of the target code 600 may be executed from within the instruction execution environment using the simulator program 605, so that a host computer 615 which does not actually have the hardware features of the apparatus 10 discussed above can emulate those features. The simulator program may include processing program logic 620 to emulate the behaviour of the processing circuitry 60, instruction decode program logic 625 to emulate the behaviour of the instruction decoder circuitry 50, and array storage emulating program logic 622 to maintain data structures to emulate the array storage 90. Hence, the techniques described herein can in the example of FIG. 14 be performed in software by the simulator program 605.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    processing circuitry to perform operations;
    instruction decoder circuitry to decode instructions to control the processing circuitry to perform the operations specified by the instructions; and
    array storage comprising storage elements to store data elements, the array storage being arranged to store at least one two dimensional array of data elements accessible to the processing circuitry when performing the operations, each two dimensional array of data elements comprising a plurality of vectors of data elements, where each vector is one dimensional;
    wherein the instruction decoder circuitry is arranged, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage elements of the array storage that were used to store the data elements of the one or more identified vectors.

2. An apparatus as claimed in claim 1, wherein:
    the processing circuitry is arranged to perform a plurality of iterations of accumulate operations and to use the given two dimensional array of data elements to maintain accumulate results produced when performing the accumulate operations, wherein after a given iteration of the accumulate operations at least one given vector of data elements in the given two dimensional array of data elements is arranged to store final accumulate results whilst the remaining vectors of data elements in the given two dimensional array of data elements are arranged to store intermediate accumulate results; and
    the move and zero instruction is arranged to identify the at least one given vector of data elements and is executed after the given iteration of the accumulate operations to cause the processing circuitry to move the final accumulate results of the at least one given vector from the array storage to the destination storage and to clear the storage elements of the array storage that were used to store the final accumulate results of the at least one given vector in order to free those storage elements for use in subsequent accumulate operations.

3. An apparatus as claimed in claim 2, wherein:
the plurality of iterations of accumulate operations are processing and accumulate operations used to implement a finite impulse response (FIR) filtering operation on an array of input data elements, and the given two dimensional array of data elements within the array storage is used to maintain an array of output data elements generated during performance of the FIR filtering operation; and
the processing circuitry is arranged during each iteration of the accumulate operations to process a single vector of input data elements and to produce output data elements for accumulating within multiple vectors of the array of output data elements.

4. An apparatus as claimed in claim 1, wherein the given two dimensional array of data elements is a square two dimensional array of data elements, the plurality of vectors forming the square two dimensional array of data elements comprise a first plurality of vectors arranged in a first array direction and a second plurality of vectors arranged in a second array direction orthogonal to the first array direction, and each instance of the move and zero instruction is arranged to identify one or more vectors of data elements that either all extend in the first array direction or all extend in the second array direction.

5. An apparatus as claimed in claim 4, wherein:
the processing circuitry is arranged to perform processing operations on the square two dimensional array of data elements during which the processing circuitry is enabled to access vectors of data elements in both the first array direction and the second array direction.

6. An apparatus as claimed in claim 1, wherein:
the array storage comprises a plurality of array vector registers extending in a first array direction, and the processing circuitry is arranged to perform one or more accumulation operations, where each accumulation operation is arranged to produce output data for accumulating within a group of multiple array vector registers of the array storage;
the given two dimensional array of data elements comprises the data elements stored within the group of multiple array vector registers; and
the move and zero instruction is executed, once performance of the one or more accumulation operations has resulted in final result data being present in the one or more identified vectors identified by the move and zero instruction, to cause the processing circuitry to move the data elements of the one or more identified vectors from the array storage to the destination storage and to set to a logic zero value each array vector register within the group of multiple array vector registers that was used to store the data elements of the one or more identified vectors.

7. An apparatus as claimed in claim 6, wherein when the processing circuitry has completed performance of the one or more accumulation operations, final result data is present in each array vector register in the group of multiple array vector registers, and execution of the move and zero instruction causes the final result data to be moved from the group of multiple array vector registers to the destination storage, and for each array vector register in the group of multiple array vector registers to be cleared to zero.

8. An apparatus as claimed in claim 1, further comprising:
a vector register file comprising a plurality of vector registers; and the move and zero instruction is arranged to indicate, as the destination storage, one or more vector registers within the vector register file.

9. An apparatus as claimed in claim 1, wherein the move and zero instruction is arranged to indicate, as the destination storage, one or more locations in memory to which the data elements of the one or more identified vectors are to be stored.

10. An apparatus as claimed in claim 4, wherein the move and zero instruction comprises a vector identification field used to identify the one or more vectors of data elements of the given two dimensional array of data elements within the array storage.

11. An apparatus as claimed in claim 10, wherein the vector identification field comprises a first sub-field to identify the square two dimensional array, and a second sub-field providing one or more line identifiers and an array direction indication used to identify the one or more vectors.

12. An apparatus as claimed in claim 1, wherein the move and zero instruction comprises a predicate field to identify predicate information used to identify which data elements of the one or more identified vectors are to be moved from the array storage to the destination storage and have their associated storage elements set to the logic zero value.

13. An apparatus as claimed in claim 12, wherein the move and zero instruction further comprises a size field to identify a size of each data element within the one or more identified vectors.

14. A method of handling data elements within an array storage of an apparatus, comprising:
employing processing circuitry to perform operations;
employing instruction decoder circuitry to decode instructions to control the processing circuitry to perform the operations specified by the instructions;
providing, within the array storage, storage elements to store data elements, the array storage being arranged to store at least one two dimensional array of data elements accessible to the processing circuitry when performing the operations, each two dimensional array of data elements comprising a plurality of vectors of data elements, where each vector is one dimensional; and
employing the instruction decoder circuitry, in response to a move and zero instruction that identifies one or more vectors of data elements of a given two dimensional array of data elements within the array storage, to control the processing circuitry to move the data elements of the one or more identified vectors from the array storage to a destination storage and to set to a logic zero value the storage elements of the array storage that were used to store the data elements of the one or more identified vectors.

15. A non-transitory, computer-readable storage medium storing a computer program for controlling a host data processing apparatus to provide an instruction execution environment, comprising:
processing program logic to perform operations;
instruction decode program logic to decode instructions to control the processing program logic to perform the operations specified by the instructions; and
array storage emulating program logic to emulate an array storage comprising storage elements to store data elements, the array storage being arranged to store at least one two dimensional array of data elements accessible to the processing program logic when performing the operations, each two dimensional array of data elements comprising a plurality of vectors of data elements, where each vector is one dimensional;

wherein the instruction decode program logic is arranged, in response to a move and zero instruction that identifies one or more vectors of data elements of a given two dimensional array of data elements within the array storage, to control the processing program logic to move the data elements of the one or more identified vectors from the array storage to a destination storage and to set to a logic zero value the storage elements of the array storage that were used to store the data elements of the one or more identified vectors.

* * * * *